United States Patent
Kato

(10) Patent No.: US 10,204,107 B2
(45) Date of Patent: Feb. 12, 2019

(54) RECORDING AND REPRODUCING DATA BASED ON CONVERSION OF DATA FORMAT

(71) Applicant: Sony Corporation, Tokyo (JP)

(72) Inventor: Motoki Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 512 days.

(21) Appl. No.: 14/374,654

(22) PCT Filed: Nov. 29, 2012

(86) PCT No.: PCT/JP2012/080870
§ 371 (c)(1),
(2) Date: Jul. 25, 2014

(87) PCT Pub. No.: WO2013/114716
PCT Pub. Date: Aug. 8, 2013

(65) Prior Publication Data
US 2015/0039654 A1     Feb. 5, 2015

(30) Foreign Application Priority Data

Feb. 3, 2012    (JP) ................................ 2012-021570

(51) Int. Cl.
    *G06F 17/30*       (2006.01)
    *H04N 5/92*       (2006.01)
    (Continued)

(52) U.S. Cl.
CPC .. *G06F 17/30076* (2013.01); *G06F 17/30091* (2013.01); *G06F 17/30165* (2013.01); *G06F 21/602* (2013.01); *G11B 27/031* (2013.01); *G11B 27/322* (2013.01); *H04N 5/907* (2013.01); *H04N 5/92* (2013.01); *H04N 9/8205* (2013.01);
(Continued)

(58) Field of Classification Search
CPC ..................... G06F 17/30076; G06F 17/30218
See application file for complete search history.

(56) References Cited

U.S. PATENT DOCUMENTS 7,106,946 B1    9/2006   Kato
7,702,861 B2    4/2010   Kelly et al.
(Continued)

FOREIGN PATENT DOCUMENTS

JP     2001-167528 A    6/2001
JP     2004-350251 A    12/2004
(Continued)

OTHER PUBLICATIONS

International Search Refpor from International Publication PCT/JP2012/080870 dated Dec. 25, 2012.

*Primary Examiner* — Grace Park
(74) *Attorney, Agent, or Firm* — Chip Law Group

(57) ABSTRACT

Provided is an information processing device including an application execution unit configured to perform a record data generation process according to a first file system, a second medium compatible file system unit configured to perform a data recording process according to a second file system different from the first file system, and a file conversion processing unit configured to perform a conversion process between a file compatible with the first file system and a file compatible with the second file system.

14 Claims, 24 Drawing Sheets

(51) Int. Cl.

| | | |
|---|---|---|
| *H04N 5/907* | (2006.01) | |
| *H04N 9/82* | (2006.01) | |
| *H04N 21/418* | (2011.01) | |
| *H04N 21/426* | (2011.01) | |
| *H04N 21/432* | (2011.01) | |
| *H04N 21/4402* | (2011.01) | |
| *H04N 21/854* | (2011.01) | |
| *G06F 21/60* | (2013.01) | |
| *G11B 27/031* | (2006.01) | |
| *G11B 27/32* | (2006.01) | |

(52) U.S. Cl.
CPC ... *H04N 21/4184* (2013.01); *H04N 21/42646* (2013.01); *H04N 21/4325* (2013.01); *H04N 21/440218* (2013.01); *H04N 21/85406* (2013.01); *G11B 2220/2541* (2013.01)

(56) References Cited

U.S. PATENT DOCUMENTS

| | | | |
|---|---|---|---|
| 8,041,184 B2 | 10/2011 | Kato | |
| 8,311,398 B2 | 11/2012 | Maeda et al. | |
| 8,594,491 B2 | 11/2013 | Kato | |
| 2005/0175317 A1* | 8/2005 | Chung | G06F 17/30179 386/232 |
| 2007/0203732 A1* | 8/2007 | Griegel | G06Q 30/02 705/75 |
| 2007/0279787 A1* | 12/2007 | Ito | G11B 27/329 360/48 |
| 2010/0211556 A1* | 8/2010 | Ueda | G11B 27/034 707/705 |
| 2010/0215344 A1 | 8/2010 | Kato | |
| 2010/0306202 A1* | 12/2010 | Lee | G06F 17/30179 707/741 |
| 2012/0041964 A1* | 2/2012 | Kreiner | G06F 17/30179 707/756 |
| 2016/0012113 A1* | 1/2016 | Klum | G06F 17/30569 707/756 |

FOREIGN PATENT DOCUMENTS

| | | |
|---|---|---|
| JP | 2006-523882 A | 10/2006 |
| JP | 2007-305171 A | 11/2007 |
| JP | 2008-262381 A | 10/2008 |
| JP | 2010-191489 A | 9/2010 |

* cited by examiner

FIG. 12

```
zzzzz.CPI {
        ClipInfo()
        EP_map()
        ProgramInfo()
}
```

FIG. 13

```
EP_map() {
        stream_PID
        number_of_EP_entries
        for (i=0;
i<number_of_EP_entries; i++) {
                PTS_EP_start[i]
                SPN_EP_start[i]
        }
}
```

FIG. 18

| FILE DIVISION/CONNECTION RULE |
|---|
| INTEGER MULTIPLE OF ALIGNED UNIT [aligned unit = 6 KB (6144 byte)] WHICH IS ENCRYPTION PROCESSING UNIT OF CONTENT STORED IN APPLICATION MEDIUM (Bul-ray Disc) OF FIRST FILE SYSTEM AND INTEGER MULTIPLE OF MINIMUM DATA UNIT (32KB) ALLOWABLE TO MAINTAIN FILE DATA IN SECOND FILE SYSTEM (FAT32) ARE SET AS FILE DIVISION POINTS |

FIG. 19

| ORIGINAL FILE | FILE NAME CONVERSION RULE | DIVIDED FILE |
|---|---|---|
| [00001. MTS] | | (MTS) IS SET AS EXTENSION WITHOUT CHANGE AND SERIAL NUMBERS (m) IS SET AFTER FILE NAME [zzzzz] (SERIAL NUMBERS m ARE DECIMAL NUMBERS, HEXADECIMAL NUMBERS, BASE-36 NUMBERS, OR THE LIKE)<br><br>SETTING EXAMPLE OF SERIAL NUMBERS (DECIMAL):<br>[00001-01. mts], [00001-02. mts], [00001-03. mts]···, OR<br>[00001-00. mts], [00001-01. mts], [00001-02. mts]··· |

FIG. 24

(1) VIRTUAL CLIP AV STREAM FILE

REPRODUCTION START POSITION (SPN_EP_start)

| 00001-00.MTS | 00001-01.MTS | 00001-02.MTS | b'
b (2) FILE SYSTEM INFORMATION

| FILE NAME | FILE SIZE [bytes] |
|---|---|
| 00001-00.MTS | X |
| 00001-01.MTS | Y |
| 00001-02.MTS | Z |

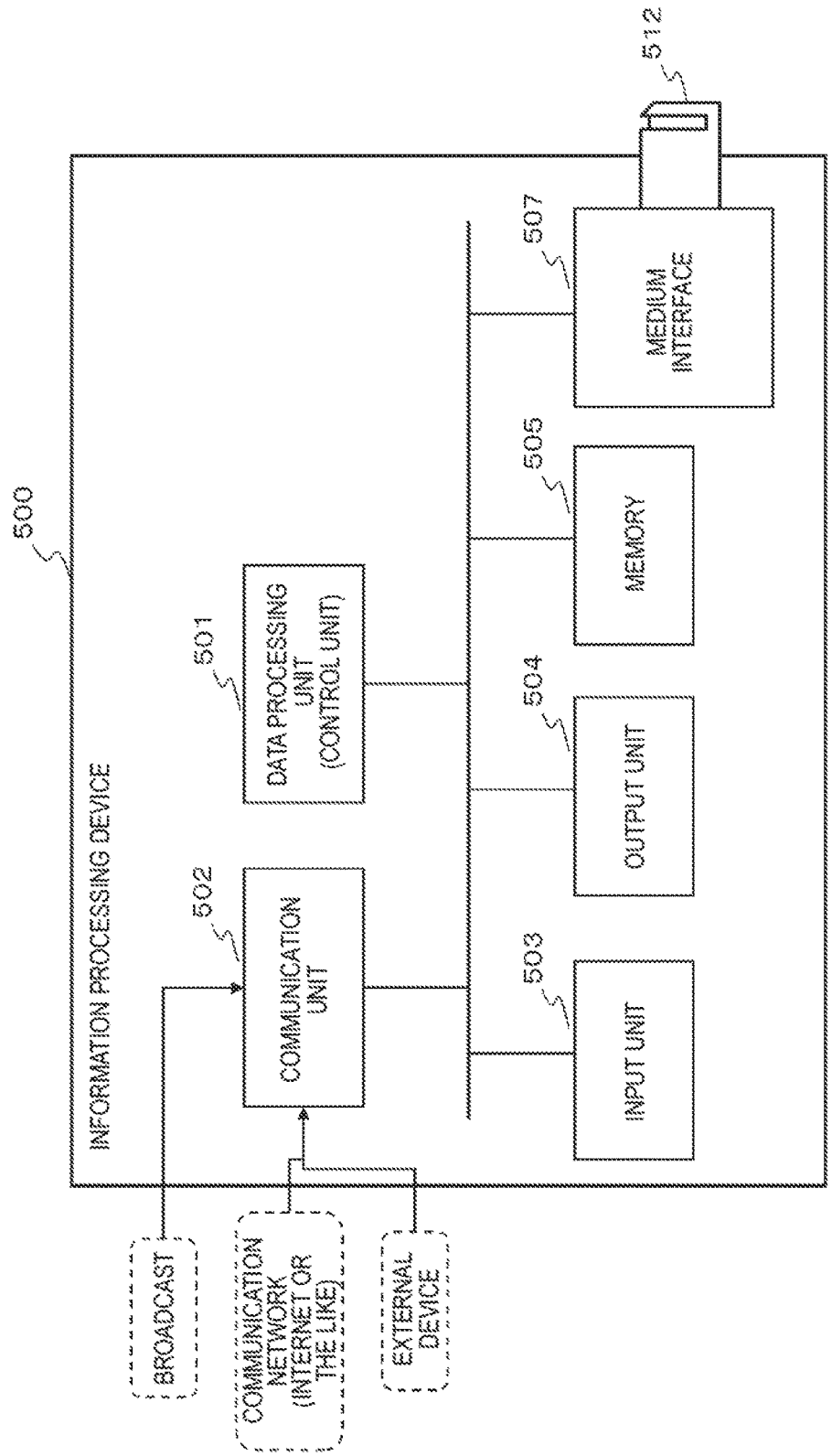

RECORDING AND REPRODUCING DATA BASED ON CONVERSION OF DATA FORMAT

CROSS-REFERENCE TO RELATED APPLICATION

The present application is a national phase entry under 35 U.S.C. § 371 of International Application No. PCT/JP2012/080870 filed Nov. 29, 2012, published on Aug. 8, 2013 as WO 2013/114716 A1, which claims priority from Japanese Patent Application No. JP 2012-021570, filed in the Japanese Patent Office on Feb. 3, 2012.

TECHNICAL FIELD

The present disclosure relates to an information processing device, an information recording medium, an information processing method, and a program, and more particularly, to an information processing device, an information recording medium, an information processing method, and a program performing a data recording or reproducing process by converting data according to a file system compatible with a use medium such as a disc or a flash memory.

The present disclosure relates to an information processing device, an information recording medium, an information processing method, and a program enabling data to be recorded or reproduced on a use medium of a file system different from a Blu-ray Disc (registered trademark), such as a flash memory using an application performing a data recording or reproducing process according to, for example, a file system compatible with Blu-ray Disc (registered trademark).

BACKGROUND ART

For example, various media such as disk-type media such as a hard disk or a Blu-ray Disc (registered trademark) or a flash memory are used as recording media to record programs using televisions, recorders, or the like or for photographed data in video cameras or the like.

As recorded data management provisions of data recording media, there are file systems. For example, the file systems regulate rules to reliably perform data recording and reproducing processes using media, such as units of recording and units of reproduction of data on media, file or directory structures, correspondent relations between actual data and management data, and rules for setting file names.

As specific file systems, there are, for example, Fail Allocation Tables (FAT) used considerably in hard disks, flash memories, and the like and Universal Disk Format (UDF) used considerably in optical discs such as Blu-ray Discs (registered trademark). FAT is described in, for example, Patent Literature 1 (JP 2008-262381A) and UDF is described in, for example, Patent Literature 2 (JP 2007-305171A) and Patent Literature 3 (JP 2004-350251A).

The file systems each have unique individual rules for the file systems. For example, in the respective files systems, there are differences in units of recording data, units of reading data, setting rules for file names, etc. Specifically, for example, FAT32 regulates a size (4 GB-1) as the maximum size of one file. However, the maximum size of one file regulated by UDF is considerably larger than (4 GB-1).

A data recording and reproducing application of a device using a Blu-ray Disc (registered trademark) which is a data recording and reproducing medium generates record data and performs setting of file names according to, for example, regulations of UDF. Most of the record data files generated by a UDF-compatible application have a considerably larger size than (4 GB-1). Accordingly, files generated by the application can be recorded or reproduced using, for example, a UDF-compatible medium such as a Blu-ray Disc (registered trademark). However, a problem may occur since a flash memory performing recording and reproducing according to, for example, a file system different from UDF, such as FAT, may not be used.

CITATION LIST

Patent Literature

Patent Literature 1: JP 2008-262381A
Patent Literature 2: JP 2007-305171A
Patent Literature 3: JP 2004-350251A

SUMMARY OF INVENTION

Technical Problem

The present disclosure is devised, for example, in light of the above-mentioned circumstances and an object of the present disclosure is to provide an information processing device, an information recording medium, an information processing method, and a program enabling an application performing a process of generating or reproducing record data compatible with a specific file system to perform a process on data compatible with another different file system.

Specifically, an object of the present disclosure is to provide an information processing device, an information recording medium, an information processing method, and a program capable of enabling use of media compatible with different file systems such as Blu-ray Disc (registered trademark) and a flash memory.

Solution to Problem

According to the first aspect of the present disclosure, there is provided an information processing device including an application execution unit configured to perform a record data generation process according to a first file system, a second medium compatible file system unit configured to perform a data recording process according to a second file system different from the first file system, and a file conversion processing unit configured to perform a conversion process between a file compatible with the first file system and a file compatible with the second file system. The file conversion processing unit inputs a file compatible with the first file system and generated by the application execution unit, generates a file compatible with the second file system and storing data with a size which is an integer multiple of a data size of a data processing unit in the first file system and is also an integer multiple of a data size of a data processing unit in the second file system, and outputs the generated file to the second medium compatible file system unit.

In an embodiment of the information processing device of the present disclosure, the file conversion processing unit divides a file compatible with the first file system and generated by the application execution unit to generate a plurality of divided files with a size which does not exceed a maximum allowable file size regulated in the second file system as files compatible with the second file system, and outputs the divided files to the second medium compatible file system unit.

In an embodiment of the information processing device of the present disclosure, the file conversion processing unit outputs a file compatible with the first file system and generated by the application execution unit to the second medium compatible file system unit by generating a file storing data with a size which is an integer multiple of a data size of an aligned unit regulated as an encryption processing unit in the first file system and is also an integer multiple of a data size of a cluster regulated as a minimum unit allocable to maintain file data in the second file system as a file compatible with the second file system.

In an embodiment of the information processing device of the present disclosure, the file conversion processing unit divides a file compatible with the first file system and generated by the application execution unit to generate a plurality of divided files with a size which does not exceed a maximum allowable file size regulated in the second file system. Of the plurality of divided files, the file conversion processing unit generates the divided files other than the final divided file by generating files storing data with a size which is an integer multiple of a data size of an aligned unit regulated as an encryption processing unit in the first file system and is also an integer multiple of a data size of a cluster regulated as a minimum unit allocable to maintain file data in the second file system as files compatible with the second file system, and generates the final divided file by generating a file storing data with a size which is an integer multiple of the data size of the aligned unit regulated as the encryption processing unit in the first file system as a file compatible with the second file system. The file conversion processing unit outputs the plurality of generated files compatible with the second file system to the second medium compatible file system unit.

In an embodiment of the information processing device of the present disclosure, the file conversion processing unit outputs the file compatible with the first file system and generated by the application execution unit to the second medium compatible file system unit by generating a file with a data size which is an integer multiple of 6 Kbytes, which is a data size of an aligned unit regulated as an encryption processing unit in the first file system, and is also an integer multiple of 32 Kbytes, which is a data size of a cluster regulated as a minimum unit allocable to maintain file data in the second file system, as the file compatible with the second file system.

In an embodiment of the information processing device of the present disclosure, the file conversion processing unit divides the file compatible with the first file system and generated by the application execution unit to generate a plurality of divided files with a size which does not exceed a maximum allowable file size regulated in the second file system as files compatible with the second file system, and sets a file name including identification information of a division source file and arrangement information of the divided file in each of the plurality of generated divided files.

According to the second aspect of the present disclosure, there is provided an information processing device including an application execution unit configured to perform a data reproducing process according to a first file system, a second medium compatible file system unit configured to perform a data reproducing process according to a second file system different from the first file system, and a file conversion processing unit configured to perform a conversion process between a file compatible with the first file system and a file compatible with the second file system. The file conversion processing unit inputs a plurality of divided files compatible with the second file system read from a second medium by the second medium compatible file system unit, generates the file compatible with the first file system by connecting the plurality of input divided files according to file names, and outputs the generated file to the application execution unit. The divided file is a file compatible with the second file system and storing data with a size which is an integer multiple of a data size of a data processing unit in the first file system and is also an integer multiple of a data size of a data processing unit in the second file system.

In an embodiment of the information processing device of the present disclosure, the file conversion processing unit acquires a source packet number indicating a packet position corresponding to a time stamp serving as reproduction start position information from an EP map recorded in a clip information file and calculates a reproduction start position through a calculation process to which the acquired source packet number is applied.

In an embodiment of the information processing device of the present disclosure, the file conversion processing unit specifies an aligned unit having the reproduction start position by dividing the source packet number by the number of constituent packets of the aligned unit regulated as an encryption processing unit in the first file system.

In an embodiment of the information processing device of the present disclosure, the file conversion processing unit further calculates the number of bytes from a file beginning of the reproduction start position by performing a calculation process to which the number of constituent bytes of the aligned unit is applied.

According to the third aspect of the present disclosure, there is provided an information recording medium recording a file according to a second file system different from a first file system suitable for a data reproducing process in an application execution unit of an information processing device. The information recording medium has, as record data, a plurality of divided files obtained by dividing a file compatible with the first file system and generated by the application execution unit. The divided file is a file compatible with the second file system and storing data with a size which is an integer multiple of a data size of a data processing unit in the first file system and is also an integer multiple of a data size of a data processing unit in the second file system.

In an embodiment of the information recording medium of the present disclosure, the divided file is a file with a size which does not exceed a maximum allowable file size regulated in the second file system and is a file storing data with a size which is an integer multiple of a data size of an aligned unit regulated as an encryption processing unit in the first file system and is also an integer multiple of a data size of a cluster regulated as a minimum unit allocable to maintain file data in the second file system.

In an embodiment of the information recording medium of the present disclosure, each of the divided files is a file in which a file name including identification information of a division source file and arrangement information of the divided file is set.

According to the fourth aspect of the present disclosure, there is provided an information processing method performed by an information processing device, the information processing method including an application execution step of performing, by an application execution unit, a record data generation process according to a first file system, a step of performing, by a second medium compatible file system unit, a data recording process according to a second file system different from the first file system, and a file conversion processing step of performing, by a file conversion processing unit, a conversion process between a file compatible with the first file system and a file compatible with the second file system. The file conversion processing step is a step of, by the file conversion processing unit, inputting a file compatible with the first file system and generated by the application execution unit, generating a file compatible with the second file system and storing data with a size which is an integer multiple of a data size of a data processing unit in the first file system and is also an integer multiple of a data size of a data processing unit in the second file system, and outputting the generated file to the second medium compatible file system unit.

According to the fifth aspect of the present disclosure, there is provided an information processing method performed by an information processing device, the information processing method including an application execution step of performing, by an application execution unit, a data reproducing process according to a first file system, a step of performing, by a second medium compatible file system unit, a data reproducing process according to a second file system different from the first file system, and a file conversion processing step of performing, by a file conversion processing unit, a conversion process between a file compatible with the first file system and a file compatible with the second file system. The file conversion processing step is a step of, by the file conversion processing unit, inputting a plurality of divided files compatible with the second file system read from a second medium by the second medium compatible file system unit, generating the file compatible with the first file system by connecting the plurality of input divided files according to file names, and outputting the generated file to the application execution unit. The divided file is a file compatible with the second file system and storing data with a size which is an integer multiple of a data size of a data processing unit in the first file system and is also an integer multiple of a data size of a data processing unit in the second file system.

According to the sixth aspect of the present disclosure, there is provided a program for causing an information processing device to perform information processing and causing an application execution unit to perform an application execution step of performing a record data generation process according to a first file system, a second medium compatible file system unit to perform a step of performing a data recording process according to a second file system different from the first file system, and a file conversion processing unit to perform a file conversion processing step of performing a conversion process between a file compatible with the first file system and a file compatible with the second file system. The file conversion processing step is a step of causing the file conversion processing unit to input a file compatible with the first file system and generated by the application execution unit, generate a file compatible with the second file system and storing data with a size which is an integer multiple of a data size of a data processing unit in the first file system and is also an integer multiple of a data size of a data processing unit in the second file system, and output the generated file to the second medium compatible file system unit.

According to the seventh aspect of the present disclosure, there is provided a program for causing an information processing device to perform information processing and causing an application execution unit to perform an application execution step of performing a data reproducing process according to a first file system, a second medium compatible file system unit to perform a step of performing a data reproducing process according to a second file system different from the first file system, and a file conversion processing unit to perform a file conversion processing step of performing a conversion process between a file compatible with the first file system and a file compatible with the second file system. The file conversion processing step is a step of causing the file conversion processing unit to input a plurality of divided files compatible with the second file system read from a second medium by the second medium compatible file system unit, generate the file compatible with the first file system by connecting the plurality of input divided files according to file names, and output the generated file to the application execution unit. The divided file is a file compatible with the second file system and storing data with a size which is an integer multiple of a data size of a data processing unit in the first file system and is also an integer multiple of a data size of a data processing unit in the second file system.

Note that the program according to the present disclosure is a program that can be provided in a storage medium or communication medium that is provided in a computer-readable form for an image processing device or a computer system that is capable of executing various types of program code, for example. Providing this sort of program in a computer-readable form makes it possible to implement the processing according to the program in the image processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to an embodiment of the present disclosure, a device and a method enabling data to be recorded and reproduced in a configuration for which an application execution unit and a file system of a data recording medium are not suitable are realized.

Specifically, the file conversion processing unit inputs the file compatible with the first file system and generated by the application execution unit and generates a plurality of divided files compatible with the second file system and storing data with a size which is an integer multiple of a data size of an aligned unit regulated as a data processing unit in the first file system and is also an integer multiple of a cluster size which is a data processing unit in the second file system. At the time of reproduction, the divided files are connected to generate a stream file compatible with the virtual first file system.

In such a configuration, a device and a method enabling data to be recorded and reproduced in a configuration for which an application execution unit and a file system of a data recording medium are not suitable are realized.

BRIEF DESCRIPTION OF DRAWINGS

FIG. 12 is a diagram for describing the syntax of a clip information file including the EP map.

FIG. 13 is a diagram for describing the syntax of the EP map.

FIG. 18 is a diagram for describing rules of a file division process and a file connection process.

FIG. 19 is a diagram for describing a conversion rule of a file name.

FIG. 24 is a diagram for describing a process of specifying a divided file having a reproduction start position and specifying a data position in the divided file.

FIG. 25 is a diagram for describing the configuration of an information processing device according to an embodiment of the present disclosure.

DESCRIPTION OF EMBODIMENTS

Figure 1:
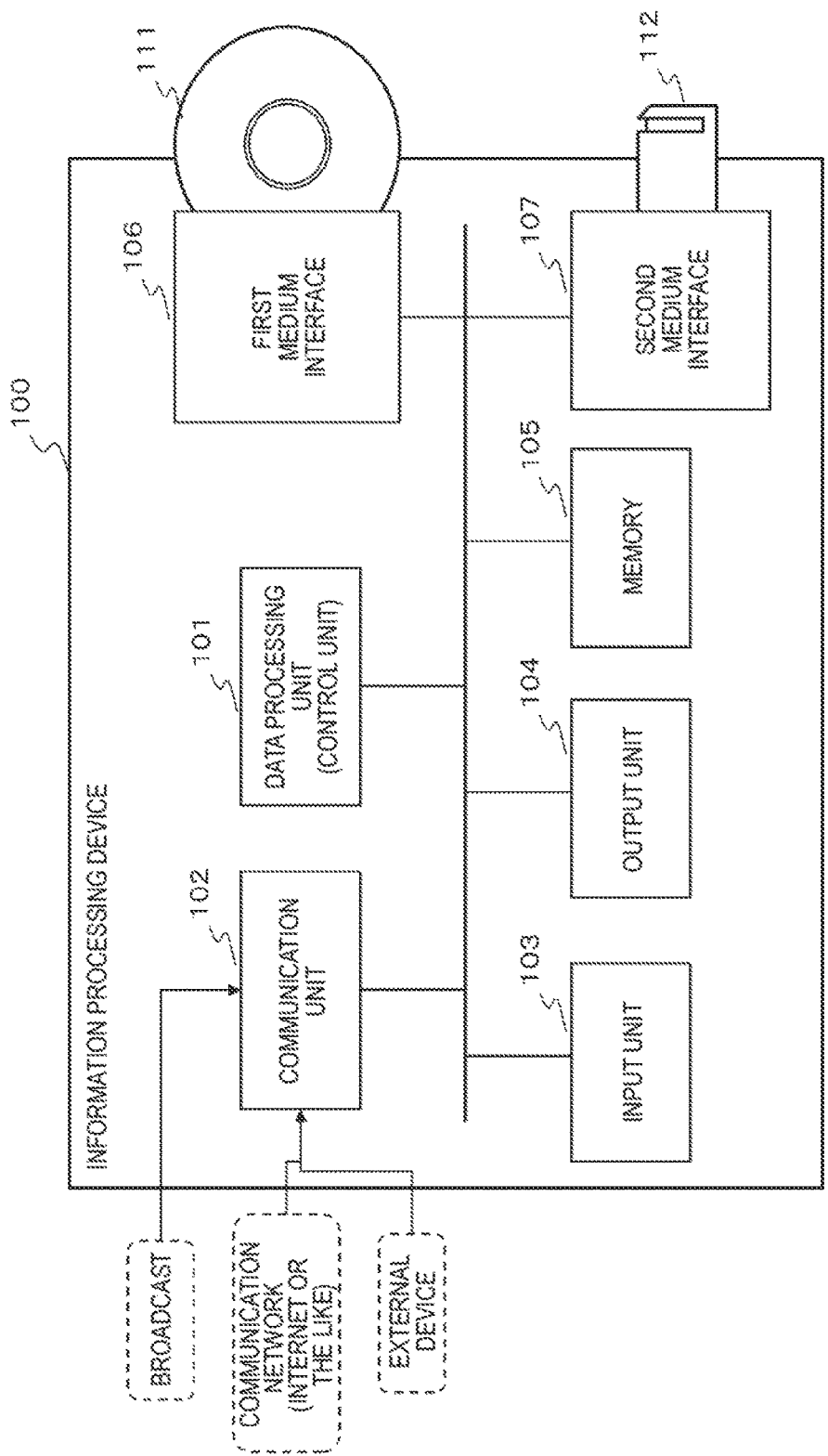
FIG. 1 is a diagram for describing the configuration of an information processing device according to an embodiment of the present disclosure.

Hereinafter, the details of an information processing device, an information recording medium, an information processing method, and a program of the present disclosure will be described with reference to the drawings. The following items will be described.

1. Overview of configuration and process of information processing device
2. Record data structure of first medium (Blu-ray Disc (registered trademark))
3. Overview of process performed by information processing device according to the present disclosure
4. Detailed structure of data to be recorded and reproduced
5. Directory and file in two file systems compatible with first and second media
6. File conversion process
7. Sequence of data recording process
8. Sequence of data reproducing process
9. Partial deletion process for data of divided files
10. Examples of configurations of other information processing devices
11. Conclusion of configuration according to the present disclosure

1. OVERVIEW OF CONFIGURATION AND PROCESS OF INFORMATION PROCESSING DEVICE

First, an overview of the configuration and a process of an information processing device according to an embodiment of the present disclosure will be described. FIG. 1 is a block diagram illustrating an example of the configuration of an information processing device 100 according to an embodiment of the present disclosure. The information processing device 100 is, for example, a data recording and reproducing device in which a Blu-ray Disc (registered trademark) is a main recording medium (first medium 111). For example, a broadcast program, data received via a network such as the Internet, data input from an externally connected device, or the like is recorded on the first medium 111 (for example, a Blu-ray Disc (registered trademark)). The data recorded on the first medium 111 is reproduced. Specifically, the information processing device 100 is, for example, a device such as a recorder, a video camera, or a PC.

The information processing device 100 further includes a second recording medium 112. The second recording medium 112 is a medium that manages record data through a different file system from the first medium. The second recording medium 112 is, for example, a flash memory. The information processing device 100 also records and reproduces data using the second medium 112, as in the first medium 111.

As illustrated in FIG. 1, the information processing device 100 includes a data processing unit (control unit) 101, a communication unit 102, an input unit 103, an output unit 104, a memory 105, a first medium interface 106, and a second medium interface 107.

The data processing unit 101 includes a CPU having a program execution function of executing various data processing programs. For example, an application program performing a data recording and reproducing process is executed. A process of recording broadcast data or the like input via the communication unit 102 on a medium, a process of reading data from a medium and reproducing the data, or the like is performed.

The communication unit 102 receives broadcast waves and performs communication via a network such as the Internet or communication with an external device. The input unit 103 is, for example, a user's operation unit and performs various inputs such as an input of a data recording or reproducing instruction. The input unit 103 also includes a remote controller so that information operated by the remote controller can also be input. The output unit 104 is an image or audio output unit including a display, a speaker, or the like. The memory 105 includes a RAM or a ROM and is used as a storage region of an application program (hereinafter described as an application) executed in the data processing unit 101. The memory 105 is also used as a parameter or working region for an application and is also used as a buffer region or the like of medium record data.

The first medium interface is an interface that is applied to a data recording and reproducing process using the first medium 111 (for example, a Blu-ray Disc (registered trademark)). For example, a process of writing data on the first medium 111 or reading data from the first medium 111 is performed in response to a request of the data processing unit 101. The second medium interface is an interface that is applied to a data recording and reproducing process using the second medium 112 (for example, a flash memory). For example, a process of writing data on the second medium 112 or reading data from the second medium 112 is performed in response to a request of the data processing unit 101.

Here, the first medium 111 (for example, a Blu-ray Disc (registered trademark)) is a medium that manages data according to a first file system (for example, UDF: Universal Disk Format). On the other hand, the second medium 112 (for example, a flash memory) is a medium that manages data according to a second file system (for example, FAT32: Fail Allocation Tables 32) different from the first file system.

A data recording and reproducing application executed in the data processing unit 101 performs data processing compatible with only one of the two different file systems. In the present example, a process compatible with the first file system (for example, UDF) of the first medium 111 (for example, a Blu-ray Disc (registered trademark)) is performed.

That is, a record file generated by an application executed in the data processing unit 101 is a data file that conforms to a data size and a file name regulated in UDF. Even when a reproducing process is performed, the data processing unit 101 performs a process in conformity with a data size and a file name regulated in UDF.

Accordingly, when an application executed in the data processing unit 101 performs a process of recording and reproducing data using the first medium 111, a process can be performed so that no problem occurs.

However, data recording or data reproducing on or from the second medium 112 (for example, a flash memory) using the second file system (for example, FAT32) may not be performed as a process of only the application.

Accordingly, the information processing device according to the present disclosure performs a file conversion process in order to enable data to be recorded and reproduced using the second medium 112 in the data processing unit 101. The details of processes performed by the data processing unit 101 will be described with reference to FIG. 2.

Figure 2:
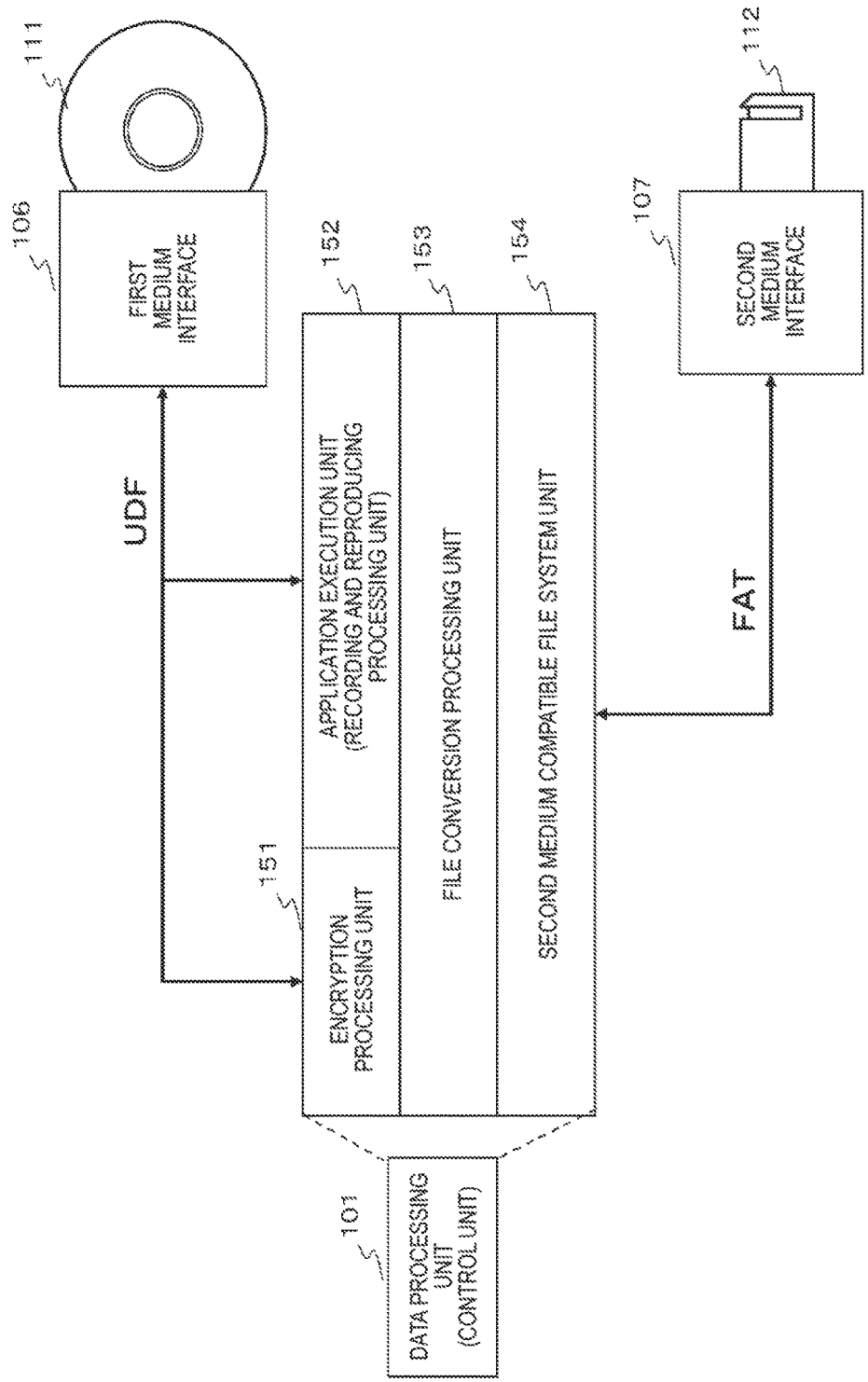
FIG. 2 is a diagram for describing the processing configuration of a data processing unit of the information processing device.

FIG. 2 is a diagram illustrating a plurality of divided processes performed by the data processing unit 101. As illustrated in FIG. 2, the data processing unit 101 includes an encryption processing unit 151, an application execution unit (recording and reproducing processing unit) 152, a file conversion unit 153, a second medium compatible file system unit 154.

Of the plurality of processing units, the encryption processing unit 151 and the application execution unit (recording and reproducing processing unit) 152 perform processes in conformity with regulations of the first file system (for example, UDF) compatible with the first medium 111, specifically, processes to which units of processing data, a file size, and a file name regulated in the first file system (for example, UDF) are applied.

The encryption processing unit 151 performs a process of encrypting record data on a medium or a process of decrypting encrypted data read from a medium. Specifically, for example, an encrypting process is performed according to Advance Access Content System (AACS) regulations which are copyright management regulations of content. The AACS regulations regulate an encrypting process of dividing content into units (CPS units) and applying an encryption key (CPS unit key) in units of units. The AACS regulations regulate an encryption processing structure when content is recorded on a Blu-ray Disc (registered trademark) which is the first medium 111. Units of data of the encrypting process performed by the encryption processing unit 151 is also properly set for units of recording of a Blu-ray Disc (registered trademark) or the like.

The application execution unit 152 also performs a process in conformity with regulations of the file system (for example, UDF) compatible with the first medium 111. A size or a file name of a record data file conforms to the regulations of the first file system (for example, UDF).

The second medium compatible file system unit 154 is a file system unit that manages record data when data is recorded or reproduced using the second medium 112 and that performs data writing and reading processes in conformity with, for example, FAT32 using the second medium 112.

The file conversion processing unit 153 performs a data conversion process between the encryption processing unit 151 and the application execution unit 152 performing the data processing in conformity with the first file system and the second medium compatible file system unit 154 performing the data writing and reading processes in conformity with the second file system.

The file conversion processing unit 153 performs, for example, the following processes.

When data generated or processed by the encryption processing unit 151 or the application execution unit 152 is recorded on the second medium 112, data received from the encryption processing unit 151 and the application execution unit 152 is converted into a format satisfying the regulations of the second file system compatible with the second medium 112 and is supplied to the second medium compatible file system unit 154.

When record data of the second medium 112 is read and supplied to the encryption processing unit 151 or the application execution unit 152, the second medium compatible file system unit 154 converts the data read from the second medium 112 into a format satisfying the regulations of the first file system and supplies the converted data to the encryption processing unit 151 or the application execution unit 152.

Figure 3:
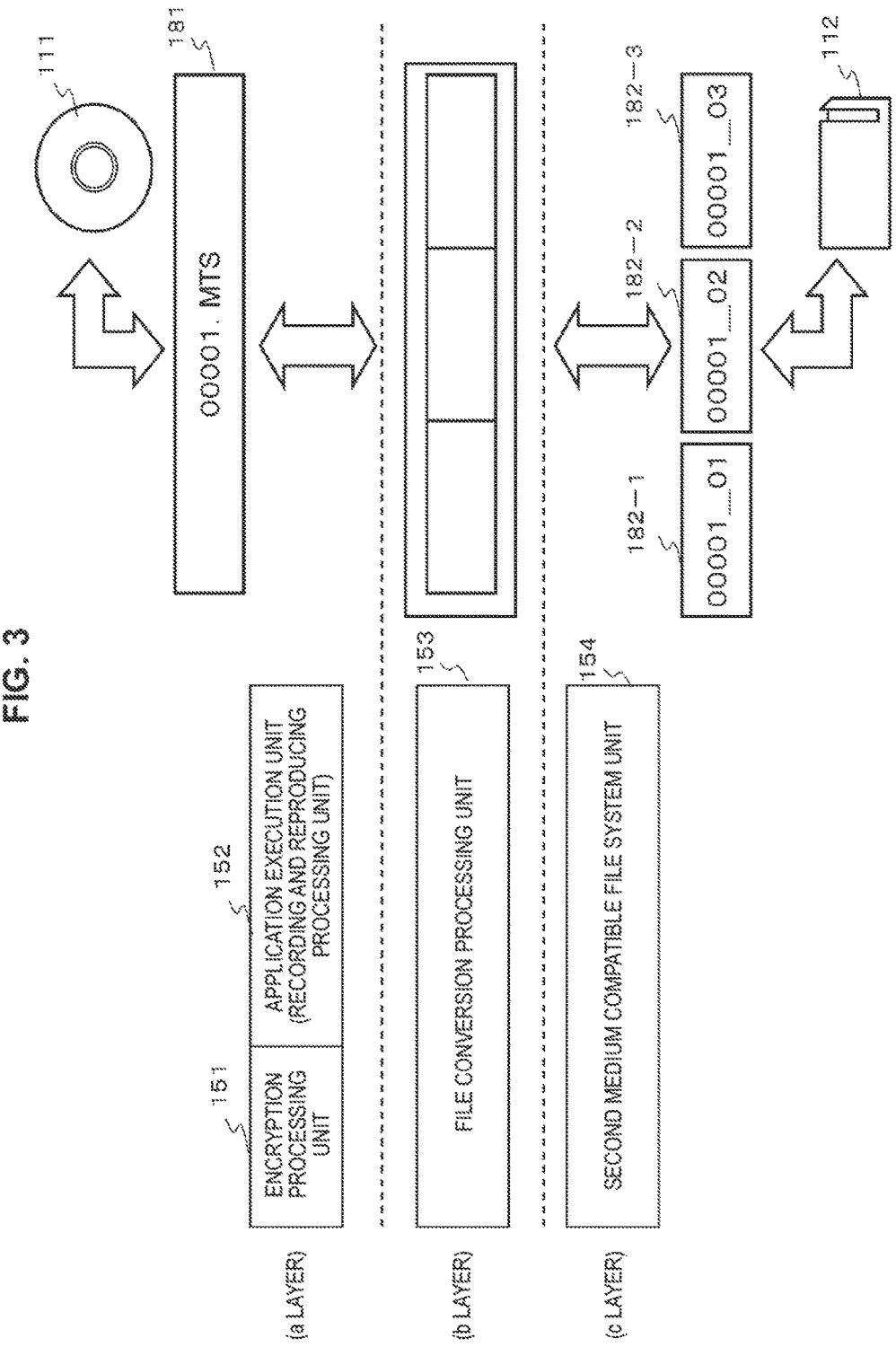
FIG. 3 is a diagram for describing a file conversion process which is a process of the data processing unit of the information processing device.

An example of a process performed by the file conversion processing unit 153 will be described with reference to FIG. 3. FIG. 3 is a diagram illustrating the data processing unit 101 divided into 3 layers as follows:

(a layer) the encryption processing unit 151 and the application execution unit 152;

(b layer) the file conversion processing unit 153; and (c layer) the second medium compatible file system unit 154.

(a layer) The encryption processing unit 151 and the application execution unit 152 perform a process corresponding to regulation rules of the first file system compatible with the first medium 111. FIG. 3 illustrates one record file 181 [00001.MTS] on the first medium 111. This file is an MPEG transport stream file which is a moving image content record file compatible with the first file system (in the embodiment, UDF).

(c layer) The second medium compatible file system unit 154 performs a process corresponding to regulation rules of the second file system compatible with the second medium 112. FIG. 3 illustrates three record files 182-1 to 182-3 ([00001_01] to [00001_03]) on the second medium 112.

(b layer) The file conversion processing unit 153 is located between (a layer) the encryption processing unit 151 and the application execution unit 152, and (c layer) the second medium compatible file system unit 154. The file conversion processing unit 153 performs a process of converting a file into a format which can be processed in each layer when a file is transmitted and received between a layer and c layer. Specifically, for example, a file size conversion process and a file name conversion process are performed.

For example, the second file system compatible with the second medium 112 is assumed to be FAT32 and the first file system compatible with the first medium 111 is assumed to be UDF. It is regulated that the maximum size of one file regulated in FAT32 is $4 \times 2^{30} - 1$ Bytes (hereinafter referred to as 4 GB-1). That is, in the FAT32 file system, the upper limit of the size of one file is $4 \times 2^{30} - 1$ Bytes (4 GB-1).

On the other hand, the size of one file regulated in UDF is a size considerably greater than (4 GB-1).

In this case, when data generated by the encryption processing unit 151 or the application execution unit 152 is recorded on the second medium 112, the file conversion processing unit 153 divides a data file generated by the encryption processing unit 151 or the application execution unit 152, generates a plurality of files in which the maximum size of one file is equal to or less than (4 GB-1), and supplies the plurality of divided files as record files to the second medium compatible file system unit 154.

That is, the data file generated by the encryption processing unit 151 or the application execution unit 152 is the file [00001.MTS] illustrated in FIG. 3. The file 181 has a file size that is regulated in the first file system (UDF) and is considerably greater than (4 GB-1). When this file is recorded on the second medium 112 compatible with the second file system (FAT32), the file conversion processing unit 153 generates a plurality of files in which the maximum size of a file is equal to or less than (4 GB-1). That is, for example, three record files 182-1 to 182-3 ([00001_01] to [00001_03]) illustrated in FIG. 3 are generated and are supplied to the second medium compatible file system unit 154.

When the second medium compatible file system unit 154 supplies a file read from the second medium 112 to the encryption processing unit 151 or the application execution unit 152, the file conversion processing unit 153 performs the following process. A process of connecting a plurality of files with a size equal to or less than (4 GB-1), that is, for example, the three record files 182-1 to 182-3 ([00001_01] to [00001_03]) illustrated in FIG. 3, to restore the original file before the division is performed. That is, a process of restoring the file [00001.MTS] illustrated in FIG. 3 is performed to supply the restored file to the encryption processing unit 151 or the application execution unit 152. Such a process will be described in detail below.

2. RECORD DATA STRUCTURE OF FIRST MEDIUM (BLU-RAY DISC (REGISTERED TRADEMARK))

Figure 4:
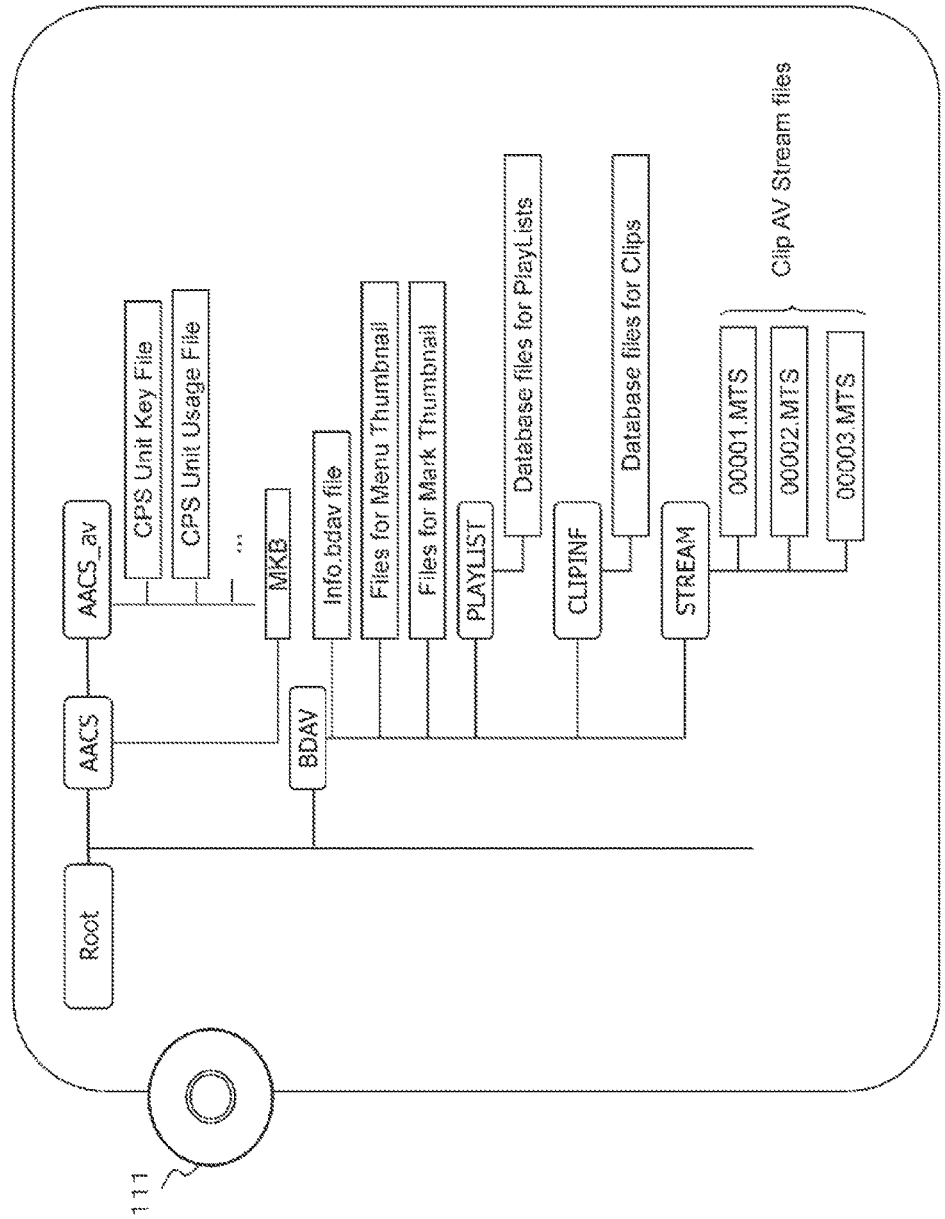
FIG. 4 is a diagram for describing an example of a data recording structure in a first medium.

Next, a data structure recorded on the first medium (Blu-ray Disc (registered trademark)) will be described with reference to FIG. 4. FIG. 4 is a diagram illustrating an example of a directory structure of a record data file of the first medium (Blu-ray Disc (registered trademark)).

As directories immediately under the root, directories of [AACS] and [BDAV] are set.

The [AACS] directory is a directory in which encryption key information or the like conforming to the regulations of Advanced Access Content System (AACS) which are the above-described copyright management regulations is set. Specifically, a CPS unit key file in which key information to be applied to a process of encrypting or decrypting content recorded on a medium is stored and an MKB (medium key block) file which is a key block for acquiring a key from a CPS unit key are set.

The [BDAV] directory is a directory in which reproduction control information or the like to be applied to a reproducing process is set in addition to actual data of record content.

Specifically, index information (info.bday.file) including a title or the like corresponding to content, a menu thumbnail (Files for Menu.Thumbnail) including still image content, a play list (PLAYLIST) which is reproduction control information of moving image content, clip information (CLIP-INF), and a stream (STREAM) which are actual data of content are set. In the stream directory (STREAM), for example, files (stream files) storing actual data of record content are recorded.

Each of [00001.MTS] to [00003.MTS] illustrated in FIG. 4 is one stream file. These files are MPEG transport stream files compatible with the first file system (in the embodiment, UDF).

The play list includes a play item that has designation information of reproducing target data. The play item can be matched with clip information that has reproduction section information, and thus specific clip information is selected by the play item. The clip information further retains reproduction section designation information of stream data as actual data of content, and thus the stream data is selectively read by the clip information to perform a stream reproducing process.

As described above with reference to FIG. 3, the file conversion processing unit 153 performs the file division process or the file connection process. However, the file division process or the file connection process is not a process necessary for all of the files recorded on the first medium 111 illustrated in FIG. 4. When a file recorded on the first medium 111 has a file size equal to or less than (4 GB-1) regulated in the second file system (FAT32), the file division process or the file connection process is not necessary. The file division process or the file connection process is performed only on a file that has a large file size among files generated by the encryption processing unit 151 or the application execution unit 152. That is, the file division process or the file connection process is performed only on a file that has a file size equal to or greater than (4 GB-1) regulated in the second file system (FAT32).

In the directory structure illustrated in FIG. 4, there is a probability of a file having a file size equal to or greater than (4 GB-1) regulated in FAT32 being a stream file which is actual data of content. The other files of the AACS directory setting data, the index information (info.bday.file), the menu thumbnail (Files for Menu.Thumbnail), the play list (PLAYLIST), the clip information (CLIPINF), and the like are files that have a file size equal to or less than (4 GB-1).

There is a probability of the stream files, such as stream files [00001.MTS], [00002.MTS], and [00003.MTS] illustrated in FIG. 4, having a file size equal to or greater than (4

GB-1). When these stream files are recorded on the second medium 112, the file division process is performed by the file conversion processing unit 153 illustrated in FIG. 3. Further, when the divided stream files recorded on the second medium 112 are supplied to the encryption processing unit 151 or the application execution unit 152, the file connection process is performed by the file conversion processing unit 153.

3. OVERVIEW OF PROCESS PERFORMED BY INFORMATION PROCESSING DEVICE ACCORDING TO THE PRESENT DISCLOSURE

In the FAT32 file system, there is the upper limit of $4 \times 2^{30} - 1$ Bytes (4 GB-1) in the size of one file, as described above. However, of files with the BDAV format, the size of an AV stream files exceeds 4 GB-1 in some cases. For example, an AV stream file for 2 hours at an average of 10 Mbp has a size of about 9 GB.

In the information processing device according to the present disclosure, a file with the BDAV format is assumed to be recorded and reproduced with a recording medium managed by the FAT32 file system. For example, one AV stream file with the BDAV format is recorded as divided files with a size less than 4 GB-1 Bytes on a recording medium managed by the FAT32 file system.

Here, the size of one divided file is assumed to have a size of an integer multiple of an aligned unit regulated as an encryption processing unit, that is, an aligned unit of 6 kBytes (6×1024). Further, the divided files other than the final divided file of one AV stream file are assumed to have a size of an integer multiple of 96 kBytes (96×1024).

That is, when one AV stream file with the BDAV format is divided into n divided files with a size less than 4 GB-1 Bytes, (n−1) divided files with a size of an integer multiple of 96 kB (here, less than 4 GB-1 Bytes) and one divided file with a size of an integer multiple of 6 kB (here, less than 4 GB-1 Bytes) are set and recorded.

These n divided files with the size less than 4 GB-1 Bytes are set and recorded on a recording medium managed by the FAT32 file system.

The data size of 96 kBytes corresponds to a data size equal to 16 aligned units (each of which is 6 kBytes (6*1024)) which are each an encryption processing unit in the BDAV format.

Further, the data size corresponds to a data size equal to 3 cluster sizes (each of which is 32 kBytes (32×1024)) which are each the minimum unit of data recording and reproduction in FAT32.

A cluster is the minimum unit which can be allocated to retain file data in FAT32. When a file size is a multiple of the cluster size, efficiency is the highest in the storage of the file data. On the other hand, when a file size is not a multiple of the cluster size, a redundant portion occurs in the storage of a file. That is, a difference between a file size and a multiple of the cluster size is a redundant portion.

4. DETAILED STRUCTURE OF DATA TO BE RECORDED AND REPRODUCED

Figure 5:
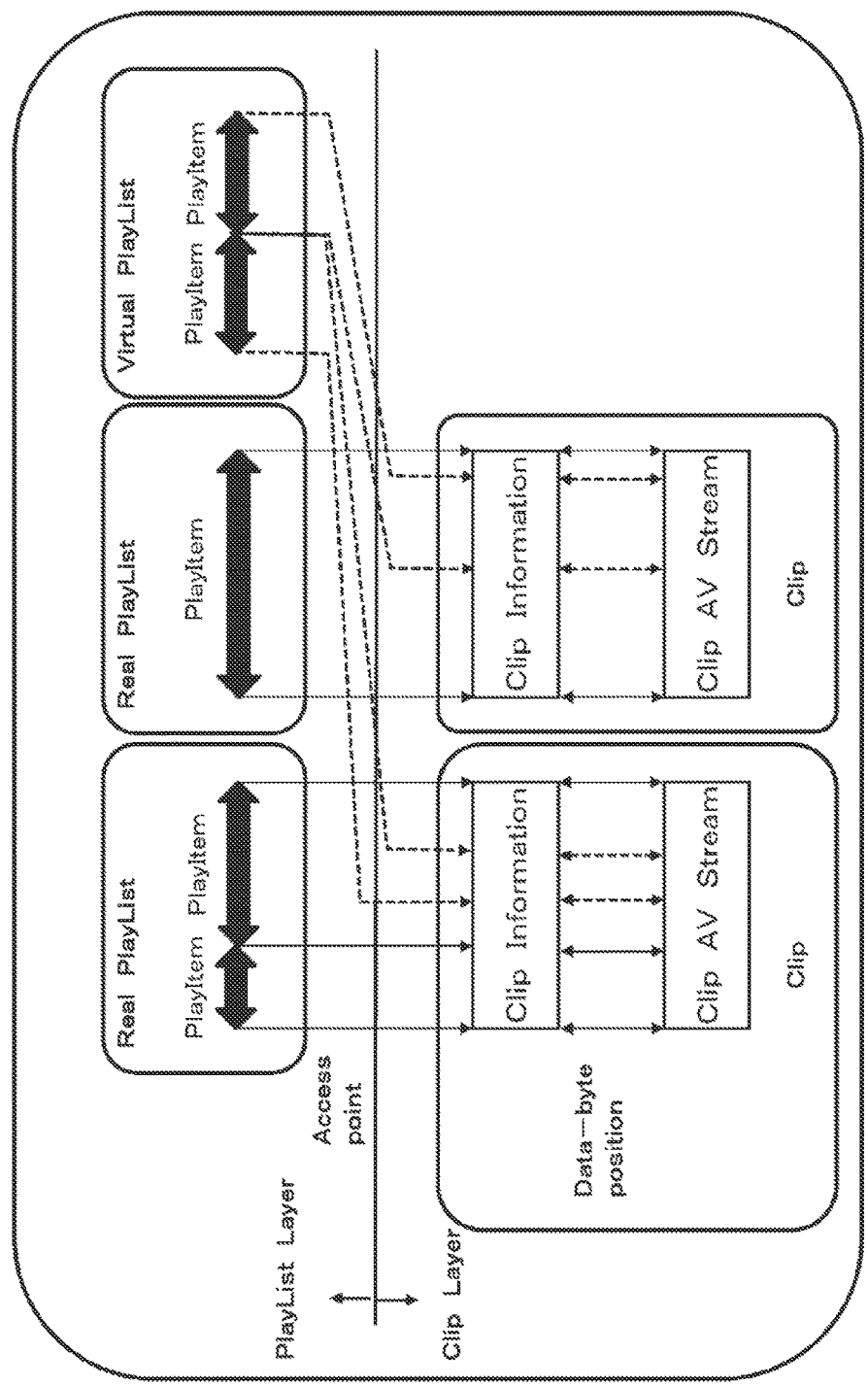
FIG. 5 is a diagram for describing an example of a data structure to be recorded and reproduced.

FIG. 5 illustrates the structure (application format) of data recorded on a medium or read from a medium by the information processing device. An AV stream formed by image and audio data which is data to be actually reproduced is recorded as a clip AV stream file, and a playlist file and a clip information file are regulated as management information and reproduction control information files of this AV stream.

The files of the plurality of categories can be classified into two layers:
a playlist layer including a playlist file; and
a clip layer formed by a clip AV stream file and a clip information file.

One clip information file can match one clip AV stream file. A pair of the clip information file and the clip AV stream file is considered to be one object and the pair thereof is collectively referred to as a clip.

Detailed information of data included in the clip AV stream file, for example, management information such as an EP map recording position information or the like of an I picture of MPEG data, is recorded in the clip information file.

The clip AV stream file stores data for which an MPEG2 transport stream is arrayed according to a regulation structure of the BDAV application format.

For example, the clip information file also stores management information for acquiring a data position of byte sequence data of the clip AV stream file and a reproduction start position or the like of input data of a clip AV stream file, such as correspondent data such as a reproduction time position which is an (entry point: EP) which is a reproduction start point at the time of development on a time axis.

For example, when a time stamp indicating a reproduction time passing position from a start point of content is given, a data reading position of the clip AV stream file, that is, an address serving as a reproduction start point, can be acquired with reference to the clip information file.

The playlist file has reproduction section designation information of reproducible data included in the clip (=a clip information file+a clip AV stream file) layer. The playlist file can be edited and various playlists can be generated by a user.

Figure 6:
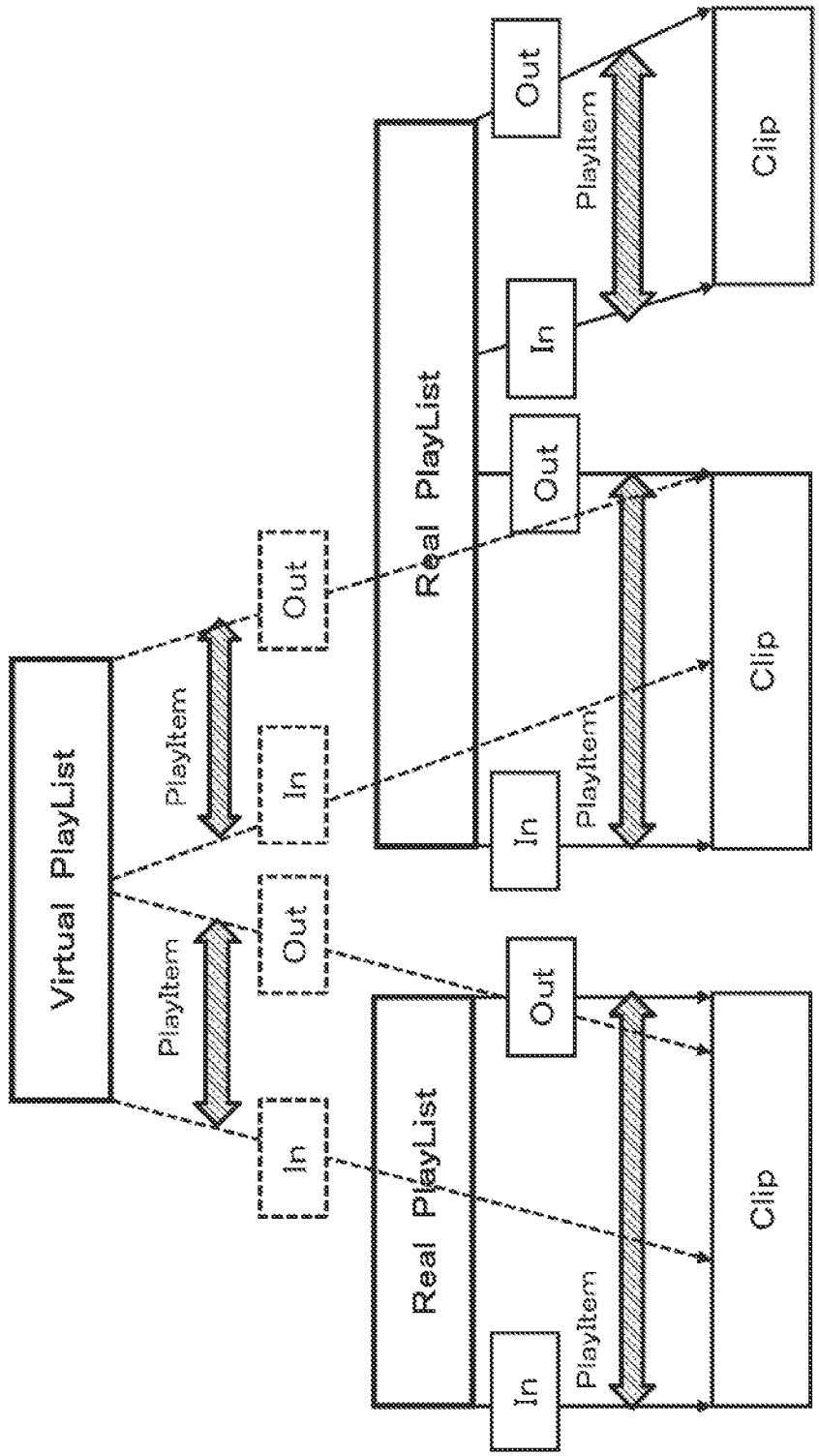
FIG. 6 is a diagram for describing an example of the structure of a play list and a clip.

As illustrated in FIG. 6, one play list is regulated as a set of reproduction section designation information of a clip. In the playlist, a playitem serving as regulation information of one reproduction section of a given clip is recorded. The playitem has information regarding an IN point indicating a reproduction start point on a time axis and an OUT point indicating a reproduction end point on the time axis.

The playlist can retain a plurality of playitems and data reproduction can be performed according to the reproduction start point and the reproduction end point regulated by the playitem.

There are two types of playlists.

One type of playlist is a real playlist and the other type of playlist is a virtual playlist.

The real playlist is regarded to share, that is, integrate, a stream portion of the clip referred to by the real playlist. When the real playlist is erased, the stream portion referred to by the real playlist is also erased.

On the other hand, the virtual playlist is a virtual playlist that does not share, that is, does not integrate, the data of the clip. Even when the virtual playlist is changed or erased, the clip is not changed or erased.

Figure 7:
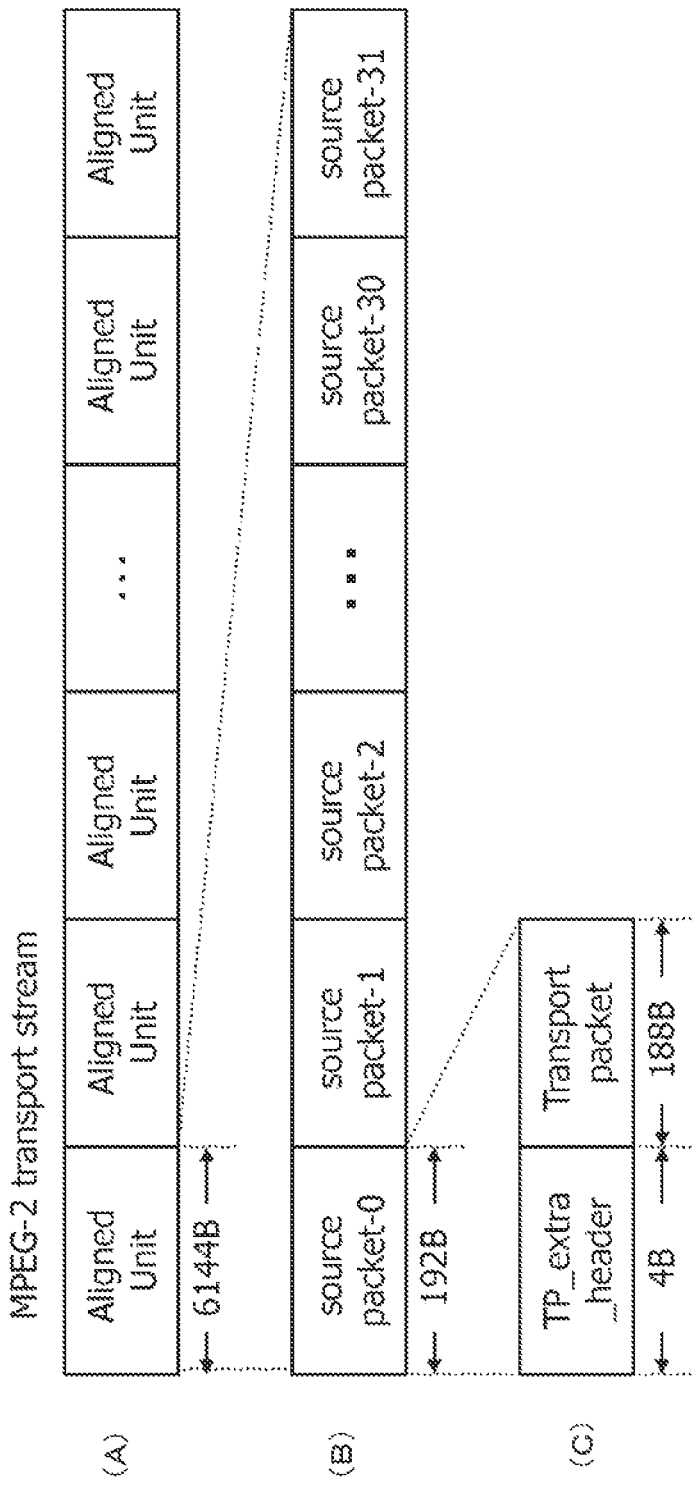
FIG. 7 is a diagram for describing the structure of an MPEG2 transport stream.

The clip AV stream file storing actual data of an image or audio to be reproduced has a BDAV MPEG2 transport stream (TS) file structure illustrated in FIG. 7.

The BDAV MPEG2 transport stream file structure has the following settings.

1) A BDAV MPEG2 transport stream file is configured to include an integer number of aligned units.

2) The size of an aligned unit is 6 kB (=6144 bytes (2048×3 bytes)).

3) An aligned unit starts from the first byte of a source packet.

4) A source packet has a length of 192 bytes. One source packet has a TP_extra_header and a transport packet. The TP_extra_header has a length of 4 bytes and the transport packet has a length of 188 bytes.

5) One aligned unit has 32 source packets.

6) The final aligned unit of the BDAV MPEG2 transport stream file also has 32 source packets. Accordingly, the BDAV MPEG2 transport stream file is terminated at a boundary of the aligned units.

7) When the number of transport packets of an input transport stream recorded on a recording medium is not a multiple of 32, a source packet having a null packet (transport packet of "PID=0x1FFF") has to be used in the final aligned unit.

For example, when a clip AV stream file is encrypted and recorded, an AES-CBC encryption process is performed in units of aligned units of 6 kB to be recorded for each aligned unit.

Figure 8:
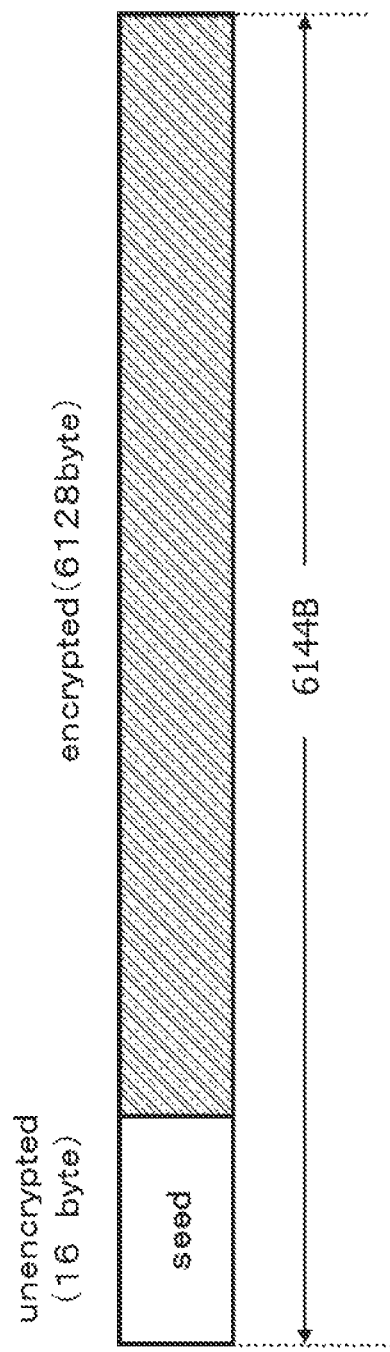
FIG. 8 is a diagram for describing the structure of an aligned unit.

As illustrated in FIG. 8, a 16-byte header of an aligned unit is a plain text, a block key is generated as seed data using the header as encryption key generation information, and 6128-byte data of the remaining aligned unit continuing from the header is encrypted by AES-CBC.

As described above, the playlist has information indicating an access point corresponding to a reproduction start position or a reproduction end position of a clip by a time stamp which is information on the time axis.

The clip information file is used to search for address information at which decoding a stream in the clip AV stream file starts, from the time stamp.

Figure 9:
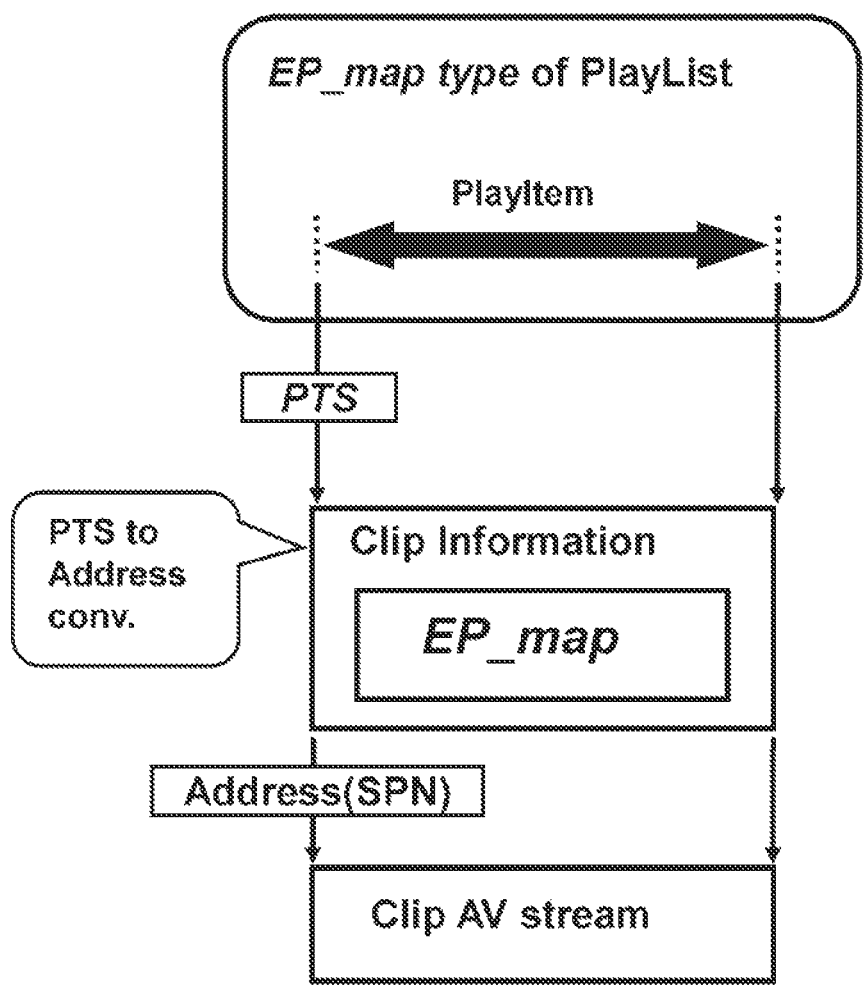
FIG. 9 is a diagram for describing an EP map.

Specifically, the clip information file has an EP map (EP_map) illustrated in FIG. 9.

The EP map has correspondent data of the time stamp expressed as access point information corresponding to a reproduction start position or a reproduction end position of a clip on the time axis and address information expressed by a primary packet usage.

Specifically, the EP map has correspondent information of:

(a) a time stamp (PTS: Presentation Time Stamp) expressing an access point on a time axis; and (b) a source packet number (SPN) causing the access point to correspond to an address indicating a packet position in a clip AV stream.

A corresponding address (SPN) can be acquired from the time stamp by referring to the EP map having the correspondent information and, for example, a decoding start point or the like which is a reproduction start point in the AV stream can be found based on the address (SPN).

Figure 10:
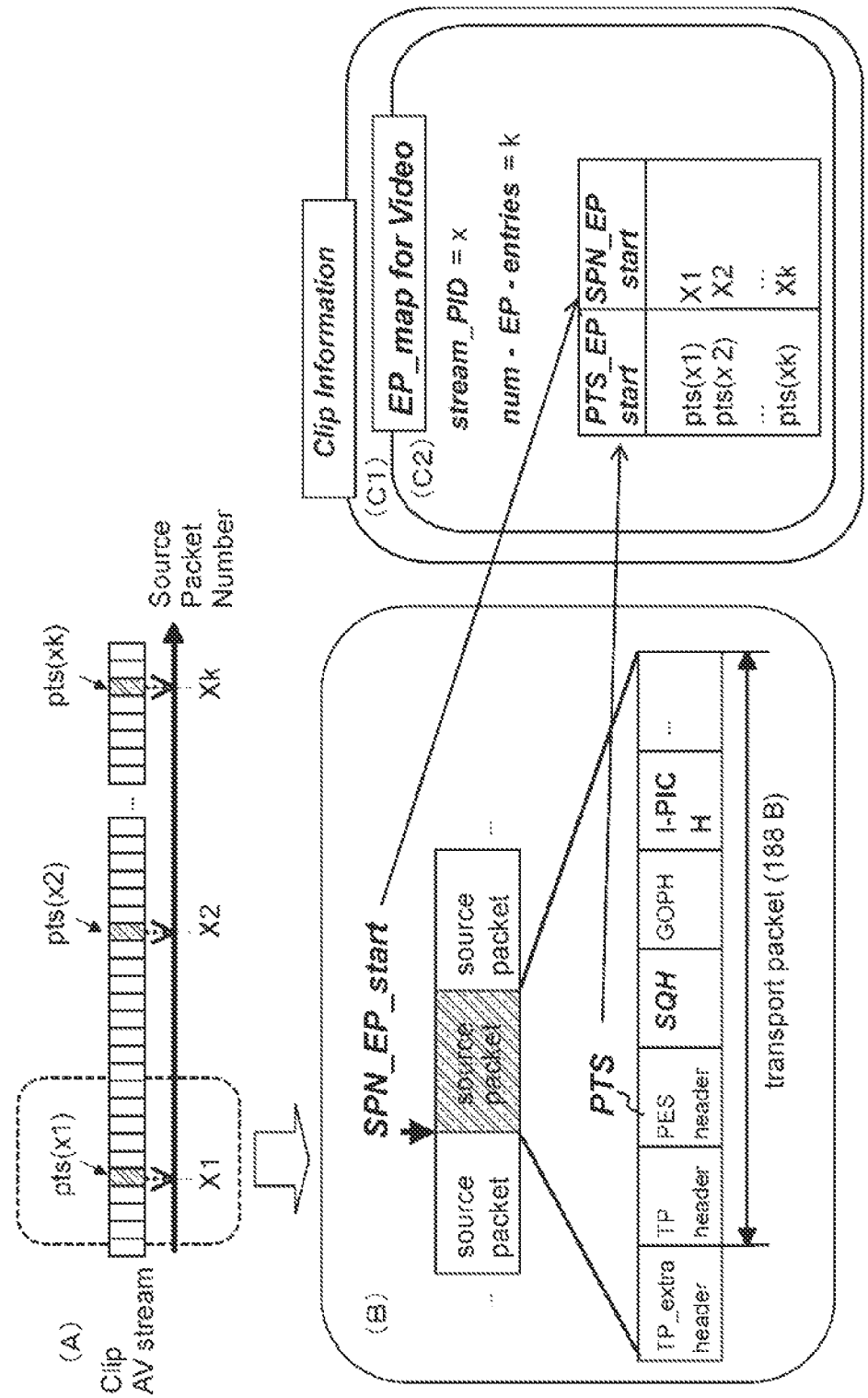
FIG. 10 is a diagram for describing the structure and a use example of the EP map.

FIG. 10 is a diagram for describing a specific structure and a use example of the EP map (EP_map). In a clip AV stream illustrated in FIG. 10(A), a video stream formed by source packets identified by a packet identifier: PID is multiplexed. The video stream is distinguished for each source packet by the PID included in the header of a transport packet in the source packet.

The source packet of the video stream has IPB pictures included in MPEG data, that is, an I (Intra) picture, a P (Predictive) picture, and a B (Bidirectionally predictive) picture. The I picture is picture data which can be decoded on its own. For the other P and B pictures, it is necessary to refer to the previous and subsequent I pictures when decoding is performed. For example, a reproduction start position by random access is set at a packet position with the I picture which can be decoded on its own.

The EP map retains position information regarding the I picture serving as randomly accessible reproduction start point position information as the correspondent data of the PTS and the SPN described above.

That is, the EP map retains the correspondent information:

(a) a time stamp (PTS: Presentation Time Stamp) expressing an access point on a time axis; and (b) a source packet number (SPN) corresponding to an address indicating a packet position in a clip AV stream by the access point.

By referring to the EP map set in this way, the place of the I picture which is the randomly accessible reproduction start position can be obtained. The EP map (EP_map) is data included in the clip information file.

Detection of the position of the I picture based on the EP map will be described with reference to FIG. 10. FIG. 10(A) illustrates a clip AV stream and each rectangle indicates a 192-bit source packet.

In the drawing, a source packet including the header bytes of the I (Intra) picture is indicated by a tetragon with diagonal lines. A white tetragon with no diagonal lines indicates a source packet which includes data which does not become a random access point or a source packet which includes data of another stream.

For example, a source packet of source packet number X1 including the header bytes of a randomly accessible I picture of a video stream distinguished by "PID=x" is arrayed at the position of "PTS=pts(x1)" on the time axis of a clip AV stream. Likewise, a source packet including the header bytes of a subsequently randomly accessible IDR picture is regarded to be a source packet of source packet number X2 and is arrayed at the position of "PTS=pts(x2)."

As illustrated in FIG. 10(B), the source packet is configured such that a 4-byte header (TP_extra_header) is added to a 188-byte transport packet. The transport packet portion includes a header portion (TP header) and a payload portion.

SPN_EP_start which is registered data of the EP map illustrated in FIG. 10(C2) indicates a source packet number (SPN) of a source packet including the first byte of the access unit (Access Unite) including the I picture started from a sequence header (SQH).

A series of numbers set in all of the packets in the clip AV stream file is the source packet number (SPN). In the clip AV stream file, the source packet number of the initial source packet is 0 and the source packet number of the subsequent packet is 1. Thereafter, the source packet numbers of each of the subsequent packets increase by 1.

As illustrated in FIG. 10(C2), in the EP map (EP_map), the following data is recorded:

a stream PID (stream_PID);

the number of EP entries (number_of_EP_entries);

a presentation time stamp EP start (PTS_EP_start); and a source packet number EP start (SPN_EP_start).

The stream PID (stream_PID) is a packet identifier (PID) of the transport packet for transporting a video stream.

The number of EP entries (number_of_EP_entries) is the number of entries of pairs of PTS_EP_start and SPN_EP_start included in the EP_map.

The presentation time stamp EP start (PTS_EP_start) represents a Presentation Time Stamp (PTS) of Access Unite started from the randomly accessible I picture.

The source packet number EP start (SPN_EP_start) represents a source packet number (SPN: Source Packet Number) including the first byte of the access unit (Access Unite) referred to by the value of PTS_EP_start.

The value of the PID (packet identifier) of the video stream is stored in stream_PID and EP_map( ) which is table information indicating a correspondent relation between PTS_EP_start and SPN_EP_start is generated.

For example, in the EP map of the video stream of "PID=x," a table formed by the correspondent data of the following PTS and SPN is described:

PTS=pts(x1) and source packet number (SPN) X1;
PTS=pts(x2) and source packet number (SPN) X2;
. . . ;
PTS=pts(x3) and source packet number (SPN) Xk.

The EP map (EP_map) including the above table is stored in the clip information file corresponding to one clip AV stream.

The EP map (EP_map) including such a table is referred to in order to specify a decoding start position, for example, when random access or the like is performed.

A method of calculating the address information at which decoding a stream in the clip AV stream file starts by using the EP_map at the start time of the reproduction from a time x on the time axis in the clip will be described with reference to FIG. 11.

Figure 11:
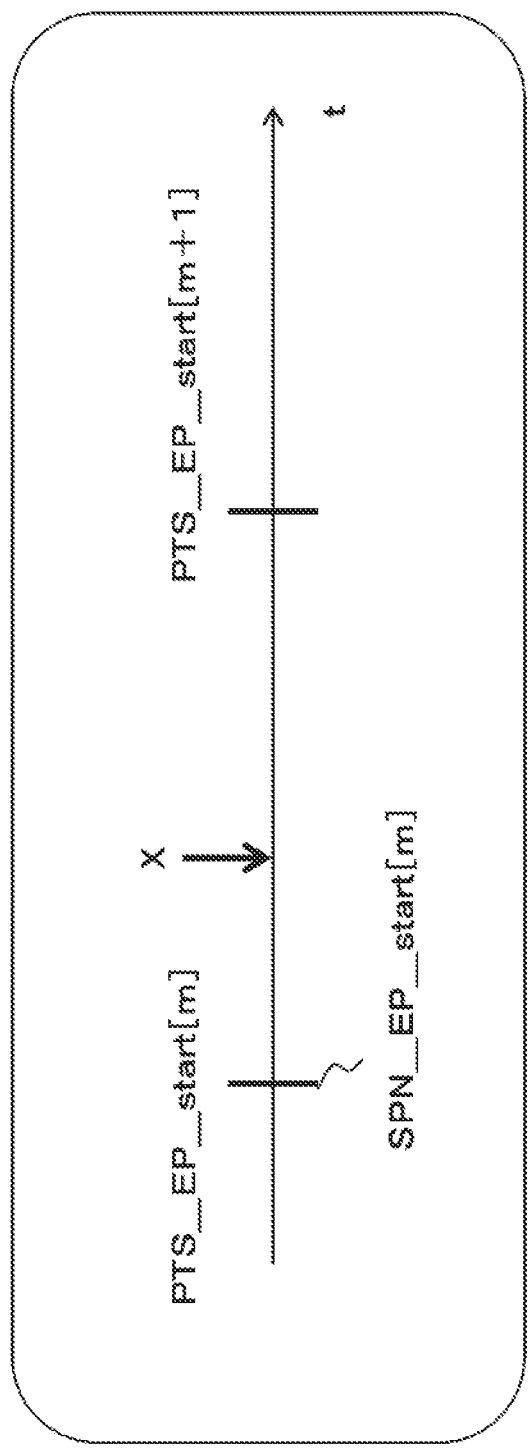
FIG. 11 is a diagram for describing an example of a process of determining a reproduction start point to which the EP map is applied.

As illustrated in FIG. 11, when a playlist has information designating reproduction start from a time x on the time axis in the clip, a time stamp [PTS_EP_start[m]] having a value which is smaller than and is the closest to x is specified.

Based on the time stamp [PTS_EP_start[m]] specified according to the playlist information, a source packet number [SPN_EP_start[m]] corresponding to the time stamp [PTS_EP_start[m]] is specified referring to the EP map in the clip information file.

Thus, by using the EP map, the SPN which is packet position information corresponding to the PTS, that is, [SPN_EP_start[m]], is acquired from the PTS which is reproduction time information determined according to the playlist information.

The packet position [SPN_EP_start[m]] is acquired as the reproduction start point in the clip AV stream file, that is, the address information at which the decoding starts, so that reproduction can be performed by performing the decoding process.

FIG. 12 is a diagram illustrating the syntax of [zzzzz.CPI] which is an example of the clip information file.

In the zzzzz.CPI, description of each of ClipInfo( ), EP_map( ), and ProgramInfo( ) is included.

In ClipInfo( ), attribute information such as a bit rate of the clip AV stream file corresponding to the clip information file is recorded.

In ProgramInfo( ), attribute information such as a method of encoding a video stream or an audio stream of the clip AV stream file corresponding to the clip information file is recorded.

FIG. 13 is a diagram illustrating the syntax of EP_map( ) described in the clip information file.

Here, stream_PID represents a packet identifier (PID) of a transport packet transporting a video stream.

Further, number_of_EP_entries represents the number of entry points (EP) of the pairs of PTS_EP_start and SPN_EP_start.

The entry point (EP) corresponds to an access point corresponding to an I picture-correspondent packet recorded as PTS-SPN-correspondent data in the EP map.

Description subsequent to number_of_EP_entries is prepared for each entry point (EP). PTS_EP_start [i] represents the PTS of the EP and SPN_EP_start[i] represents the SPN of the EP. Thus, in the EP_map, the PTS and the SPN for each entry point are registered in correspondence therewith.

5. DIRECTORY AND FILE IN TWO FILE SYSTEMS COMPATIBLE WITH FIRST AND SECOND MEDIA

As described above with reference to, for example, FIGS. 1 to 3, the information processing device according to the present disclosure performs, for example, file conversion between a data format suitable for the first file system of Blu-ray Disc (registered trademark) which is the first medium and a data format suitable for the first file system of a flash memory which is the second medium.

Specifically, the first file system is, for example, a UDF, ExFAT, or NTFS file system and the second file system is, for example, an FAT32 file system.

Hereinafter, a directory structure of each of the file systems will be described.

Figure 14:
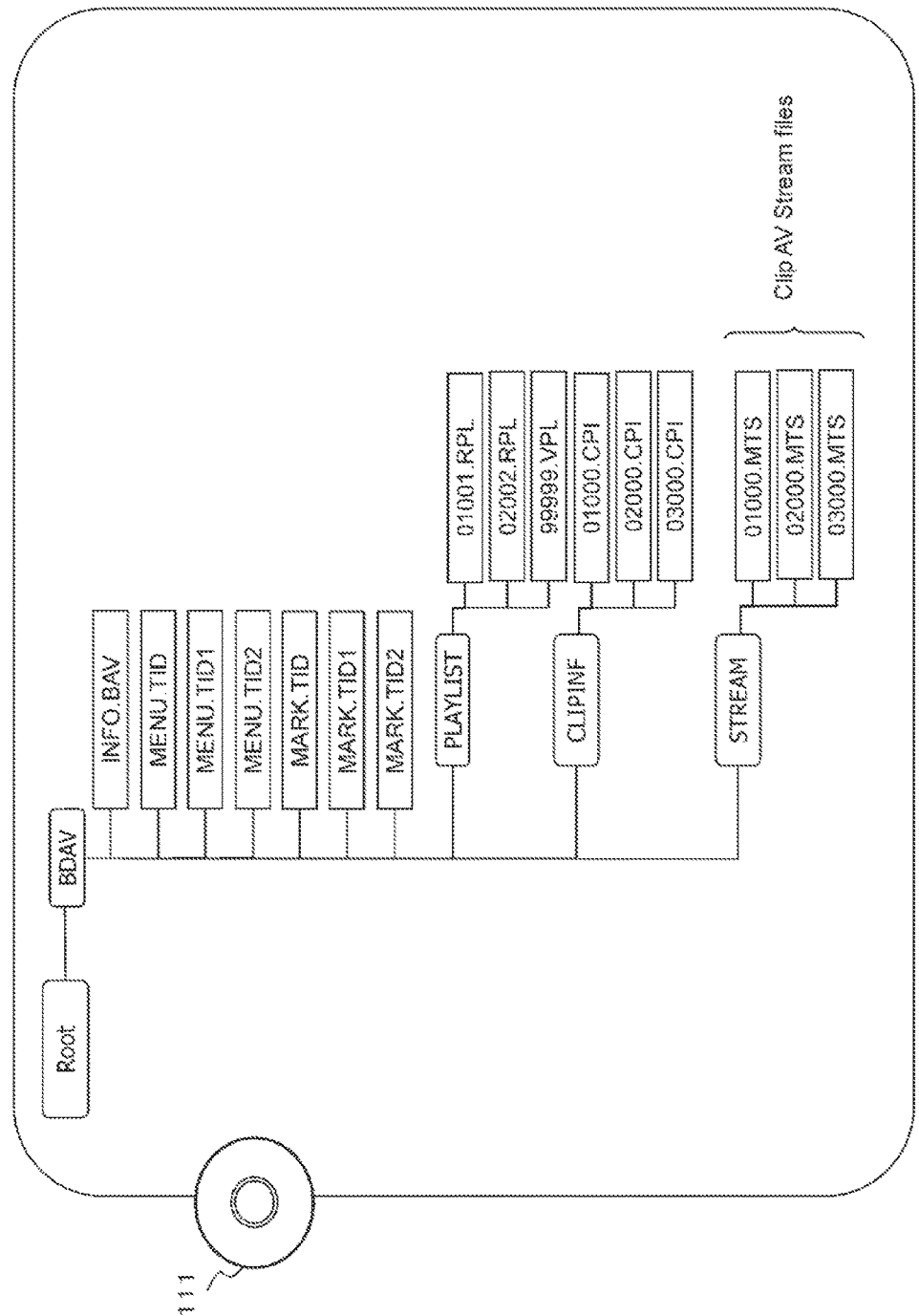
FIG. 14 is a diagram for describing an example of a data recording structure of the first medium.

FIG. 14 is a diagram illustrating examples of directories and files in the UDF, ExFAT, or NTFS file system. In the file system, the upper limit of the size of one file is considerably greater than 4 GB-1.

INFO.BAV is a file that stores overall information regarding application layers created under a BDAV directory and is the same as the info.bdav file described above with reference to FIG. 4.

MENU.TID, MEMU.TD1, and MENU.TD2 are files that store information regarding menu thumbnail images and are the same as Files for Menu Thumbnail described above with reference to FIG. 4.

MARK.TID, MARK.TD1, and MARK.TD2 are files that store information regarding mark thumbnail images and are the same as Files for Mark Thumbnail described above with reference to FIG. 4.

A playlist (PLAYLIST) directory stores two types of playlist files. The playlist files are the real playlist and the virtual playlist described above with reference to, for example, FIG. 6.

A file, xxxxx.RPL, stores information regarding one real playlist. One file is created for each real playlist. Here, "xxxxx" are five numerals from 0 to 9. A file extension has to be "RPL."

A file, "yyyy.VPL," stores information regarding one virtual playlist. One file is created for each virtual playlist. Here, "yyyyy" are five numerals from 0 to 9. A file extension has to be "VPL."

A "CLIPINF" directory stores one file to correspond to each AV stream file.

A file, "zzzzz.CPT," is a clip information file corresponding to one AV stream file. Here, "zzzzz" are five numerals from 0 to 9. A file extension has to be "CPT."

A "STREAM" directory stores a clip AV stream file.

A file, "zzzzz.MTS," is a clip AV stream file. Here, "zzzzz" are five numerals from 0 to 9. A file extension has to be "MTS."

One clip AV stream file and a clip information file corresponding thereto have to use the same five numerals "zzzzz."

Next, directories and files of the FAT32 file system will be described with reference to FIG. 15.

Of files stored in the BDAV directory described above with reference to FIG. 14, there is a probability of a file having a file size exceeding the upper limit, 4 GB-1, of the size of one file regulated in FAT32 being a clip AV stream file. The other files, that is, INFO.BAV, menu thumbnails, files of a playlist directory, and files of a clip information (CLIPINF) directory have sizes less than 4 GB-1.

Figure 15:
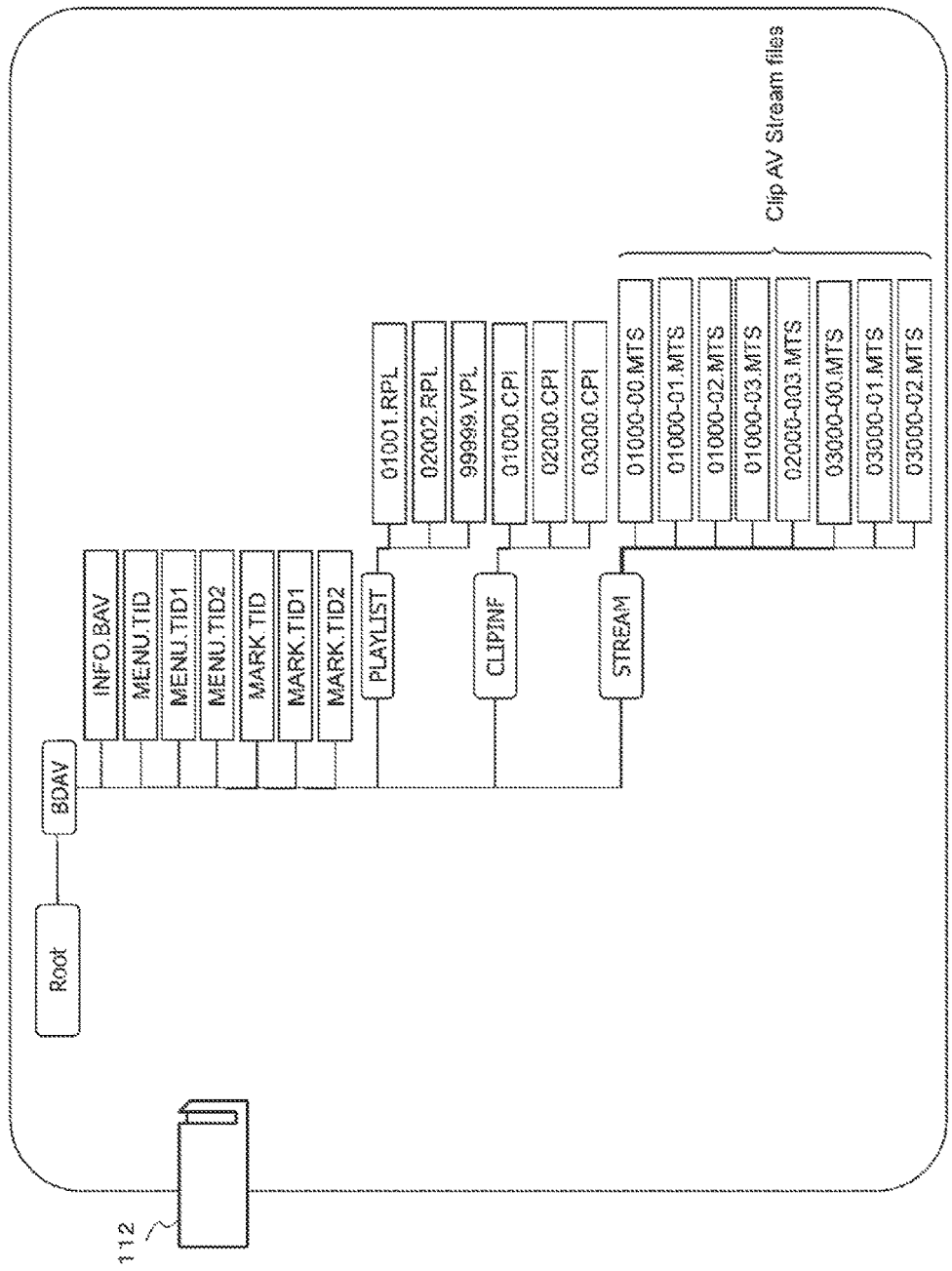
FIG. 15 is a diagram for describing an example of a data recording structure of the second medium.

Since the directories and files other than the files under the stream (STREAM) directory in the directory structure of the FAT32 file system illustrated in FIG. 15, that is, the directories and the files of INFO.BDV to CLIPINF, are the same as the directories and the files described above with reference to FIG. 14, the description thereof will be omitted.

The stream (STREAM) directory of the FAT32 directories illustrated in FIG. 15 stores the following MTS files.

The name of a file, "zzzzz-nn.MTS," is "zzzzz-nn.MTS." Here, "zzzzz" are five numerals from 0 to 9 and "nn" are two numerals from 00 to 99 (where 0 is added when a one-digit numeral from 0 to 9 is used). A file extension has to be "MTS."

6. FILE CONVERSION PROCESS

As described above, the information processing device according to the present disclosure performs, for example, file conversion between a data format suitable for the first file system of Blu-ray Disc (registered trademark) which is the first medium and a data format suitable for the second file system of a flash memory which is the second medium.

As described with reference to FIGS. 2 and 3, the file conversion processing unit in the data processing unit 101 of the information processing device illustrated in FIG. 1 converts data recorded on the first medium 111 according to the first file system into a format satisfying the regulations of the second file system compatible with the second medium 112 and supplies the converted data to the second medium compatible file system unit.

Alternatively, data recorded on the second medium 112 is converted into a format satisfying the regulations of the first file system compatible with the first medium 111 according to the second file system and is supplied to the application execution unit 152.

A specific example of the file conversion process will be described with reference to FIG. 16.

Figure 16:
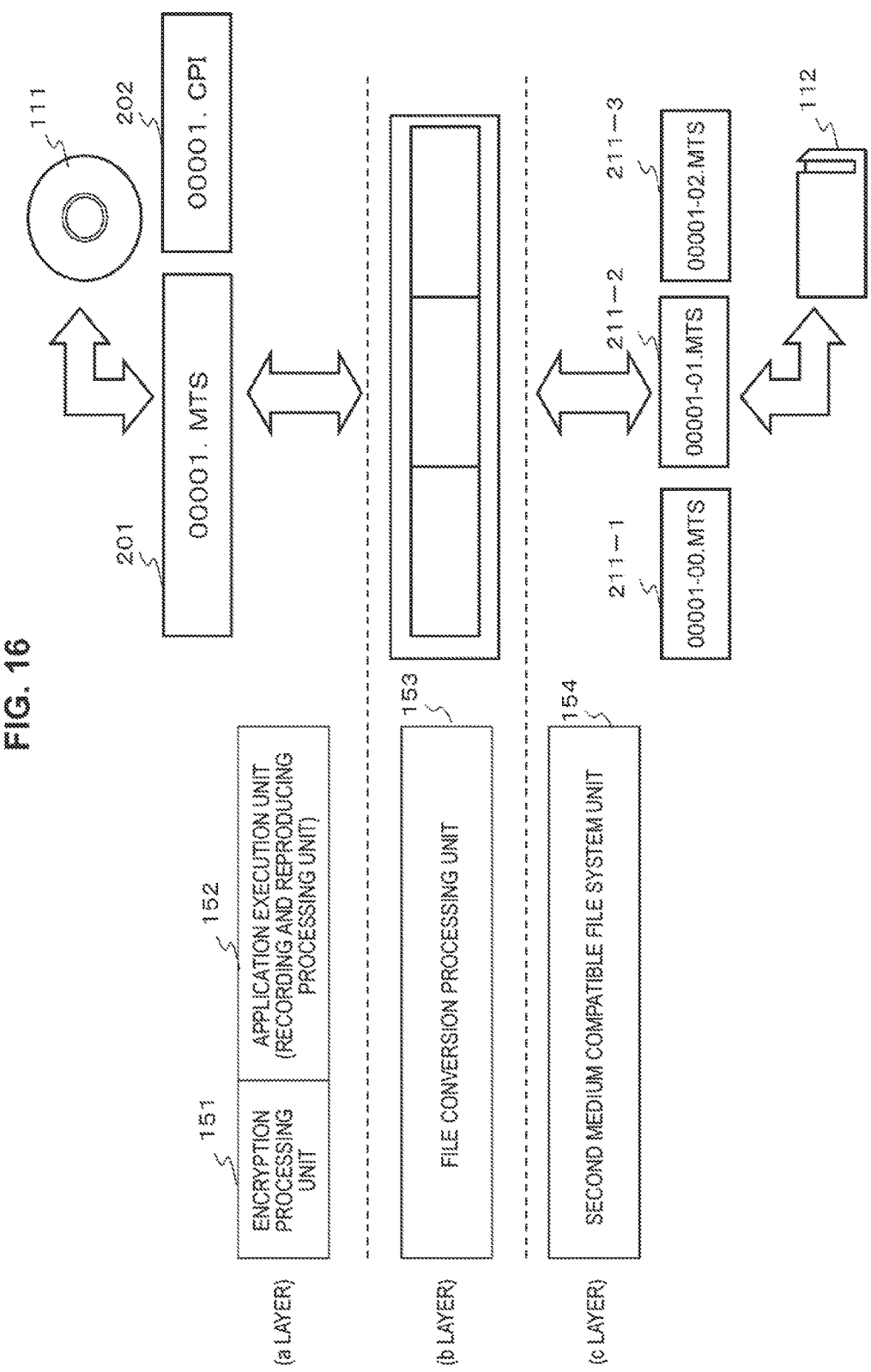
FIG. 16 is a diagram for describing a file conversion process which is a process of a data processing unit of the information processing device.

FIG. 16 is a diagram for describing a specific example of the file conversion process, as in FIG. 3 described above, and is a diagram illustrating system settings of a file to be subjected to the conversion process as the following settings.

FIG. 16 is a diagram for describing a file conversion process set such that the first file system compatible with the first medium 111 is the UDF, ExFAT, or NTFS file system described with reference to FIG. 14 and the second file system compatible with the second medium 112 is the FAT32 file system described with reference to FIG. 15.

As described with reference to FIG. 3, the data processing unit 101 divided into 3 layers as follows is illustrated:

(a layer) the encryption processing unit 151 and the application execution unit 152;

(b layer) the file conversion processing unit 153; and (c layer) the second medium compatible file system unit 154.

(a layer) The encryption processing unit 151 and the application execution unit 152 perform a process corresponding to regulation rules of the first file system compatible with the first medium 111. FIG. 16 illustrates a clip AV stream file [00001.MTS] 201 and a clip information file [00001.CPI] 202 which are record files on the first medium 111. These files are an MPEG transport stream file and a clip information file which are moving image content record files compatible with the first file system (in the embodiment, UDF).

(c layer) The second medium compatible file system unit 154 performs a process compatible with regulation rules of the second file system compatible with the second medium 112. FIG. 16 illustrates three record files on the second medium 112:

[00001-00. MTS] 211-1;
[00001-01.MTS] 211-2; and
[00001-02.MTS] 211-3.

(b layer) The file conversion processing unit 153 is located between (a layer) the encryption processing unit 151 and the application execution unit 152, and (c layer) the second medium compatible file system unit 154. The file conversion processing unit 153 performs a process of converting a file into a format which can be processed in each layer when a file is transmitted and received between a layer and c layer. Specifically, for example, a file size conversion process and a file name conversion process are performed.

For example, the second file system compatible with the second medium 112 is assumed to FAT32 and the first file system compatible with the first medium 111 is assumed to be UDF. It is regulated that the maximum size of one file regulated in FAT32 is $4 \times 2^{30}-1$ Bytes (hereinafter referred to as 4 GB-1).

That is, in the FAT32 file system, the upper limit of the size of one file is $4 \times 2^{30}-1$ Bytes (4 GB-1).

On the other hand, the size of one file regulated in UDF is a size considerably greater than (4 GB-1).

As illustrated in FIG. 16, when the following files are present as divided files with a data size equal to or less than 4 GB-1 according to the FAT32 file system:

[00001-00.MTS] 211-1;
[00001-01.MTS] 211-2; and
[00001-02.MTS] 211-3, the file conversion processing unit 153 generates a file compatible with the first file system compatible with the first medium 111 by performing a process of connecting these divided files.

Specifically, one virtual AV stream file suitable for the first file system compatible with the first medium 111 is generated by connecting the MTS files having the same numerals "zzzzz"=00001 as the high-order numeral sequence of the file names of the divided files to the low-order numeral sequence of the file names, that is, numerals "nn"=00 to 02 indicating the arrangement order of the divided files, in ascending order.

One virtual AV stream file generated through the process of connecting the divided files is formed as one clip AV stream file including the BDAV MPEG2 transport stream file described above with reference to FIG. 7.

When a process of dividing a file compatible with the first file system compatible with the first medium 111, generating a plurality of divided files, and recording the divided files on the second medium 112 is performed, the file names of the divided files are created by setting the divided MTS files having the same "zzzzz" numerals as the high-order numeral sequence of the file names of the divided files, and increasing and setting the values of the lower-order numeral sequence "nn" of the file names by 1 initially from 00.

One AV stream file is divided into MTS files with a size less than $4 \times 2^{30}-1$ Bytes (file fragments of one virtual clip AV stream file) to be recorded. Here, the size of one divided file (file fragment) is a size which is an integer multiple of an aligned unit (6 kBytes ($6 \times 1024$)) and is also a size which is an integer multiple of 96 kBytes ($96 \times 1024$) excluding the final divided file (file fragment) of the one AV stream file.

In the example illustrated in FIG. 16, the divided files excluding the divided file at the end, that is, 00001-00.MTS 211-1 and 00001-01.MTS 211-2 have a size which is an integer multiple of the aligned unit of 6 Kb and a size which is an integer multiple of 96 kBytes (96×1024). Further, the divided file at the end, 00001-02.MTS 211-3, is the final file fragment of the one AV stream file. The divided file has a size which is an integer multiple of the aligned unit of 6 Kb.

One clip AV stream file and a clip information file corresponding thereto have to use the same five numerals "zzzzz."

Here, the size of 96 kBytes is a size corresponding to sixteen aligned units (6 kBytes (6×1024)) and is a size corresponding to three units of 32 kBytes (32×1024) which is a cluster size of FAT32. Further, the cluster is the minimum unit which can be allocated to retain the file data in FAT32, as described above. When a file size is a multiple of the cluster size, efficiency is the highest in the storage of the file data. On the other hand, when a file size is not a multiple of the cluster size, a redundant portion occurs in the storage of a file (a difference between a file size and a multiple of the cluster size is a redundant portion). The first byte of each MTS file (a file fragment of one virtual clip AV stream file) is recorded in accordance with the header of a cluster.

7. SEQUENCE OF DATA RECORDING PROCESS

Next, a sequence of a data recording process involving the file conversion will be described with reference to the flowchart illustrated in FIG. 17 and the subsequent drawings. The description will be made with the following settings:

the first file system compatible with the first medium 111=UDF; and the second file system compatible with the second medium 112=FAT32.

However, the present disclosure is not limited to the combination of the above file systems, but can be applied to a configuration in which the process performed by the application execution unit is different from data processing corresponding to a file system of a use medium (in this example, the second medium).

As described above, the maximum allowable file size of FAT32 which is the second file system compatible with the second medium 112 is (4 GB-1) and the maximum allowable file size of UDF which is the first file system compatible with the first medium 111 is a size considerably greater than (4 GB-1).

The overview of the process of the file conversion processing unit 153 illustrated in FIGS. 2 and 3 is as follows.

When the application execution unit 152 or the encryption processing unit 151 performs a data recording or reproducing process or a data editing process using the second medium 112, a file division process or a file connection process is performed according to the maximum allowable file size (4 GB-1) of the second file system (FAT32) compatible with the second medium 112.

In this example, of the files to be processed by the application execution unit 152 or the encryption processing unit 151, there is a probability of a file having a file size equal to or greater than (4 GB-1) being a stream file storing the actual data of the content. The file conversion processing unit 153 performs the file conversion process involving the file division process or the file connection process on the stream file. The file conversion process involving the file division process or the file connection process is not performed on a file other than the stream file with (4 GB-1) such as a management file or a reproduction control information file.

In the file conversion process, a file name conversion process is also involved. For example, as described above with reference to FIG. 16, conversion between a file name [00001.MTS] of the original file 201 with a size equal to or greater than (4 GB-1) and the divided files 211-1 to 211-3 [00001-00 to 02.MTS] compatible with the second medium 112 to be processed in the application execution unit 152 or the encryption processing unit 151 is performed.

A process of the file conversion processing unit 153 when data is recorded on the second medium 112 will be described with reference to the flowchart of FIG. 17. The flow illustrated in FIG. 17 is a sequence of the process of recording the file generated by the application execution unit 152.

Figure 17:
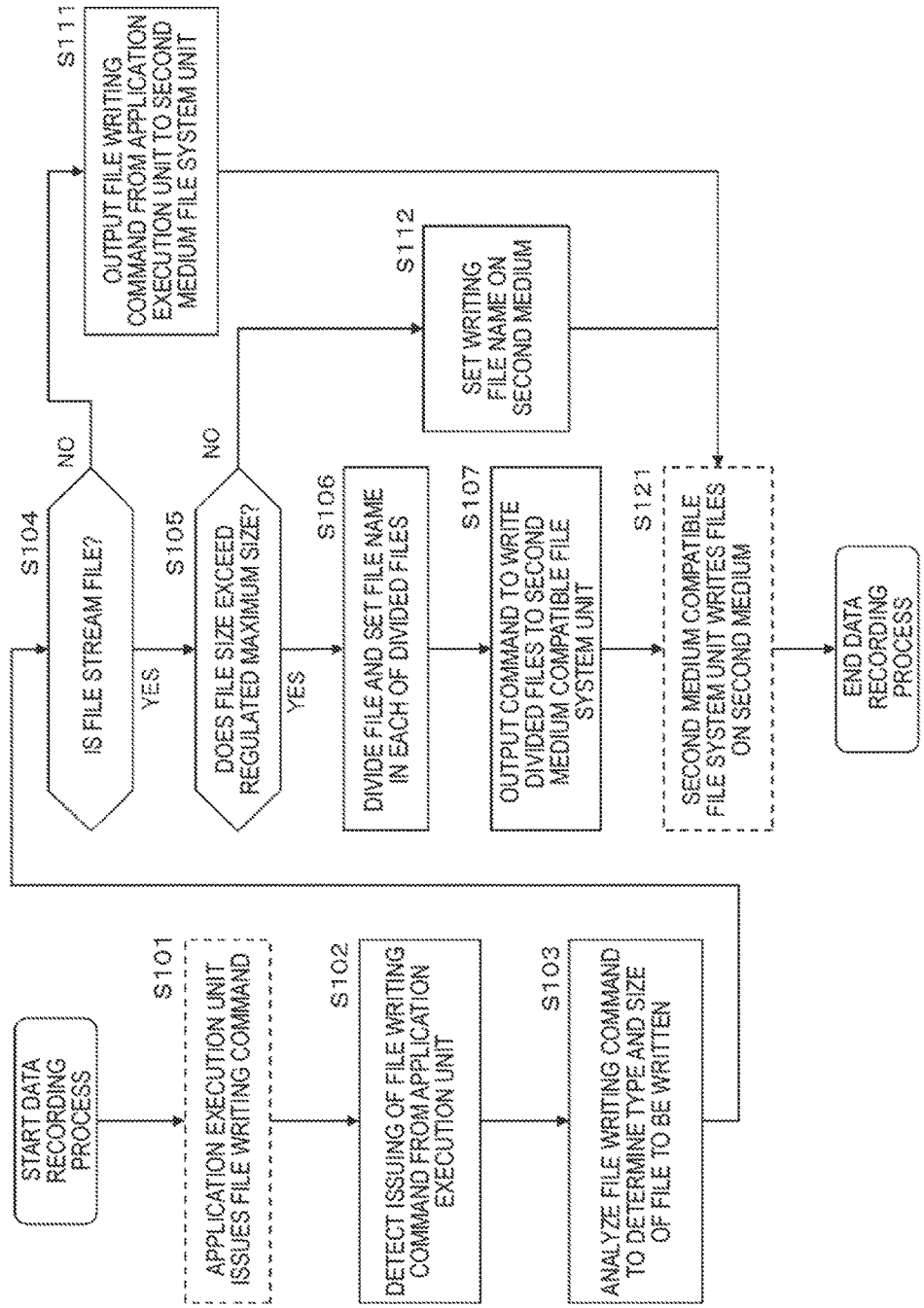
FIG. 17 is a diagram illustrating a flowchart for describing a processing sequence performed by a file conversion processing unit when a data recording process is performed on the second medium.

In the flow illustrated in FIG. 17, a process of step S101 corresponds to a process of the application execution unit, processes of step S102 to step S112 correspond to processes of the file conversion processing unit, and a process of step S121 corresponds to a process of the second medium compatible file system unit.

First, in step S101, the application execution unit issues a file writing process command. The flow of this process is a process when a writing target medium is the second medium. In step S101, the application execution unit issues the file writing command having a file name to be written as a parameter.

In step S102, the file conversion processing unit detects the issuing of the file writing command from the application execution unit.

Next, in step S103, the file conversion processing unit analyzes the file writing command issued by the application execution unit to determine a type and size of a file to be written.

In step S104, when the file conversion processing unit determines that the type of file is a stream file, the process proceeds to step S105. When it is determined in step S104 that the type of file is not a stream file, the process proceeds to step S111. In step S111, the file writing command from the application execution unit is output to the second medium file system unit without change.

As described above, the size of a file other than the stream file is guaranteed to be the maximum allowable file size (4 GB-1) in the file system compatible with the second medium. Accordingly, the file writing command to write the file other than the stream file is output to the second medium compatible file system unit without change and the process proceeds to step S121. Then, the second medium compatible file system unit performs the writing process on the second medium by directly applying the writing command generated by the application execution unit.

Conversely, when it is determined in step S104 that the type of file is a stream file, the process proceeds to step S105. When the type of file is the stream file, there is a probability of the file size being greater than the maximum allowable file size (4 GB-1) in the file system compatible with the second medium. In this case, in step S105, the file size is confirmed.

When it is confirmed that the file size is greater than the maximum allowable file size (4 GB-1) in the file system compatible with the second medium, the process proceeds to step S106. When the file size is not greater than the maximum allowable file size, the process proceeds to step S112.

In step S112, a file name of a writing target file with a size less than the maximum allowable file size (4 GB-1) is set. The file conversion processing unit performs conversion between a file name of a file (original file) generated by the application execution unit and a recording file name to be recorded on the second medium according to preset rules. A specific conversion example will be described below.

The setting of the file name in step S112 is performed as a process satisfying, for example, the following conditions:

(a) setting of a file name allowed in the second file system compatible with the second medium; and (b) setting of identification information indicating that the division process on a file (original file) generated by the application execution unit is not performed.

The setting of the file name satisfying the conditions (a) and (b) is performed. After the file name is set in step S112, the process proceeds to step S121 and the second medium compatible file system unit performs the writing process on the second medium applying the file name set in step S112. However, the conversion of the file name is performed only when the file division is performed. When the file division is not performed, setting may be performed such that the conversion of the file name is not performed.

When it is confirmed in step S105 that the file size is greater than the maximum file size (4 GB-1) allowed in the file system compatible with the second medium, the process proceeds to step S106. In step S106, the file is divided and a file name is set for each of the divided files. That is, a plurality of divided files with a size less than the maximum allowable file size (4 GB-1) allowed in the second file system compatible with the second medium are generated and a file name is set for each of the generated divided files.

As described above, the file conversion processing unit performs the conversion between the file name of the file (original file) generated by the application execution unit and the recording file name to be recorded on the second medium according to the preset rules. Even when the division process is performed, the file conversion processing unit performs the file division process according to rules regulated in advance. For example, the file conversion processing unit 153 sets a file name including identification information regarding a division source file and arrangement information of the divided file in each of the plurality of divided files. The details of file name setting rule and division rule will be described below.

The file name setting process on each of the divided files is performed as a setting process satisfying, for example, the following conditions:

(a) setting of a file name allowed in the second file system compatible with the second medium; and (b) setting of identification information indicating that the division process on a file (original file) generated by the application execution unit is performed.

The setting of the file name satisfying the conditions (a) and (b) is performed. After the file name is set in step S106, the process proceeds to step S107.

In step S107, the file conversion processing unit outputs a file writing command having the file name set for each of the divided files as a parameter to the second medium compatible file system unit. In step S121, the second medium compatible file system unit performs a process of writing all of the divided files on the second medium applying the file names of the divided files set in step S106.

As the division rule, for example, a rule illustrated in FIG. 18 is applied. That is, file division points satisfying the following conditions 1 and 2 are set:

(condition 1) an integer multiple of an aligned unit (aligned unit=6 KB (6144 bytes)) which is an encryption processing unit of content stored in an application medium (Blu-ray Disc) of the first file system; and (condition 2) an integer multiple of the minimum data unit (cluster=32 KB) allocable to maintain file data in the second file system (FAT32).

File division points satisfying these conditions 1 and 2 are set.

The file division satisfying both of (condition 1) and (condition 2) is performed.

The minimum division unit satisfying the above (condition 1) and (condition 2) is 96 KB.

That is, as the divided files, a divided file with a size which is equal to or less than 4 GB-1 and is an integer multiple of 96 KB is generated. However, the division file at the end may have a data size which is equal to or less than 4 GB-1 and is an integer multiple of 6 KB.

Next, an example of a file name conversion rule will be described with reference to FIG. 19. As described above, when the file division is performed, the file conversion processing unit 153 sets a file name including the identification information of the division source file and the arrangement information of the divided file in each of the plurality of divided files. As the file name conversion rule, for example, a rule illustrated in FIG. 19 can be applied.

A file name of the original file before the division is assumed to be [00001.MTS].

Further, (MTS) is set as an extension without change, the file name [00001] of the original file before the division is set as the high-order numeral sequence (ZZZZZ), and serial numbers (xx) indicating arrangement of the divided files are set as the low-order numeral sequence after the high-order numeral sequence (where decimal numbers, hexadecimal numbers, base-36 numbers, or the like are used as the serial numbers xx).

The file names of the divided files are as follows:

[00001-01.MTS], [00001-02.MTS], [00001-03.MTS], and so forth; or

[00001-00.MTS], [00001-01.MTS], [00001-02.MTS] and so forth.

When the division process is necessary, the setting of the file names is performed applying the above rules and the files names are recorded on the second medium. When the connection process is performed, the original file name is restored through a reverse process to the file name conversion applied at the time of the division.

The file name conversion involving the file division process has been described with reference to FIG. 19. However, setting may be performed such that a file name not involving the file division process is recorded on the second medium 112 without the conversion. When the conversion is performed, setting may be performed such that it can be determined that a file is not divided, for example, by setting an extension formed by a combination of numeral values not applied to the divided files.

Figure 20:
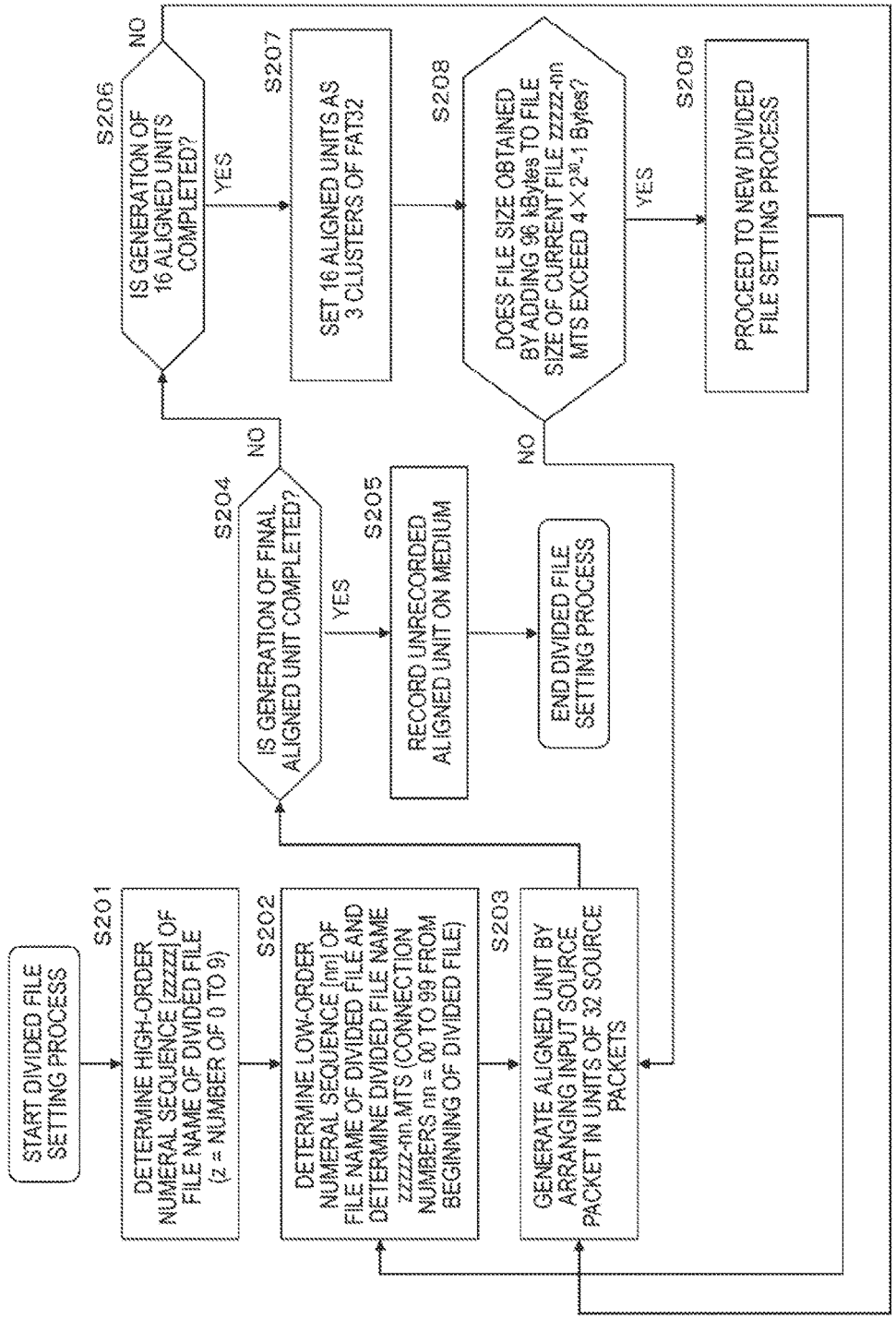
FIG. 20 is a diagram illustrating a flowchart for describing a setting sequence of divided files.

A detailed process of the divided file setting sequence will be described with reference to the flowchart illustrated in FIG. 20.

First, in step S201, a high-order numeral sequence [zzzzz] of the divided file is determined using the file name of a file [zzzzz.MTS] to be subjected to the division process. As the high-order numeral sequence zzzzz of the file name of the divided file, the file name of the file [zzzzz.MTS] to be subjected to the division process may be used without change.

For example, when a file to be subjected to the division process is [00001.MTS], the high-order numeral sequence zzzzz of the file name of the divided file is set to [00001].

Next, in step S202, the lower-order numeral sequence [nn] of the file name of the divided file is determined. The low-order numeral sequence is an identifier indicating the arrangement order of the divided files and may be set, for example, by increasing by 1 from 00, as in 00, 01, 02, 03, and so forth.

For example, when the file to be subjected to the division process is [00001.MTS], the file name of the first divided file is set to [00001-00].

Next, in step S203, a packet (192 bytes) is input from the beginning of [00001.MTS] which is a file to be subjected to the division process and an aligned unit of 6 KB arranged in units of 32 packets from the input source packet is generated. A correspondent relation between the source packet and the aligned unit is the correspondent relation described above with reference to FIG. 7.

Next, in step S204, it is determined whether the generated aligned packet is the final aligned packet of the file [00001.MTS] to be subjected to the division process. When the generated aligned packet is the final aligned packet, the process proceeds to step S205 and the unrecorded aligned unit is recorded on a medium.

Conversely, when it is determined in step S204 that the generated aligned packet is not the final aligned packet of the file [00001.MTS] to be subjected to the division process, the process proceeds to step S206 and it is determined whether the generation of 16 aligned units is completed. The size of the 16 aligned units is a data size of "6 KB×16=96 KB" and corresponds to a unit size (minimum size) of a basic divided file excluding the divided file at the end. As described above, the size of the basic divided file excluding the divided file at the end is set to be an integer multiple of 96 KB.

When it is determined in step S206 that the generation of the 16 aligned units is completed, the process proceeds to step S207. When it is determined that the generation is not completed, the process returns to step S203 and the process of generating the aligned unit continues.

When it is determined in step S206 that the generation of the 16 aligned units is completed, the 16 aligned units are set as 3 clusters in FAT 32 in step S207.

As described above, the cluster is the minimum data recording and reproducing unit in FAT32 and has a data size of 32 Kb.

Since the 16 aligned units have the size of 6 KB×16=96 KB, the 16 aligned units correspond to data of 3 clusters of 32 KB.

Next, the process proceeds to step S208 and it is determined whether a data size obtained by further adding the data of 96 KB to the data of the divided file [zzzzz-nn] which is currently being generated exceeds the maximum file size of 4 GB-1 ($4 \times 2^{30}-1$ Bytes) allowed in FAT32.

When the data size does not exceed the maximum file size, the processes of step S203 and the subsequent steps are performed again to further add the data of 96 KB to the divided file [zzzzz-nn] which is currently being generated and the generation of the aligned unit starts.

Conversely, when it is determined in step S208 that the data size obtained by further adding the data of 96 KB to the data of the divided file [zzzzz-nn] which is currently being generated exceeds the maximum file size of 4 GB-1 ($4 \times 2^{30}-1$ Bytes) allowed in FAT32, the process proceeds to step S209, the generation of the divided file which is currently being generated is completed, and the process proceeds to the generation of a subsequent divided file. In this case, the process moves to step S202, the divided file obtained by increasing the low-order numeral sequence [nn] by 1 as the file name of a new divided file is set, and data to be stored in the new divided file is generated by performing the processes of step S203 and the subsequent steps.

In this way, the divided files [zzzzz-00], [zzzzz-01], [zzzzz-03], and so forth with the data size which is equal to or less than 4 GB-1 and is an integer multiple of 96 KB are generated as the plurality of divided files.

The final divided file is set to have a data size which is equal to or less than 4 GB-1 and is an integer multiple of 6 KB.

8. SEQUENCE OF DATA REPRODUCING PROCESS

Figure 21:
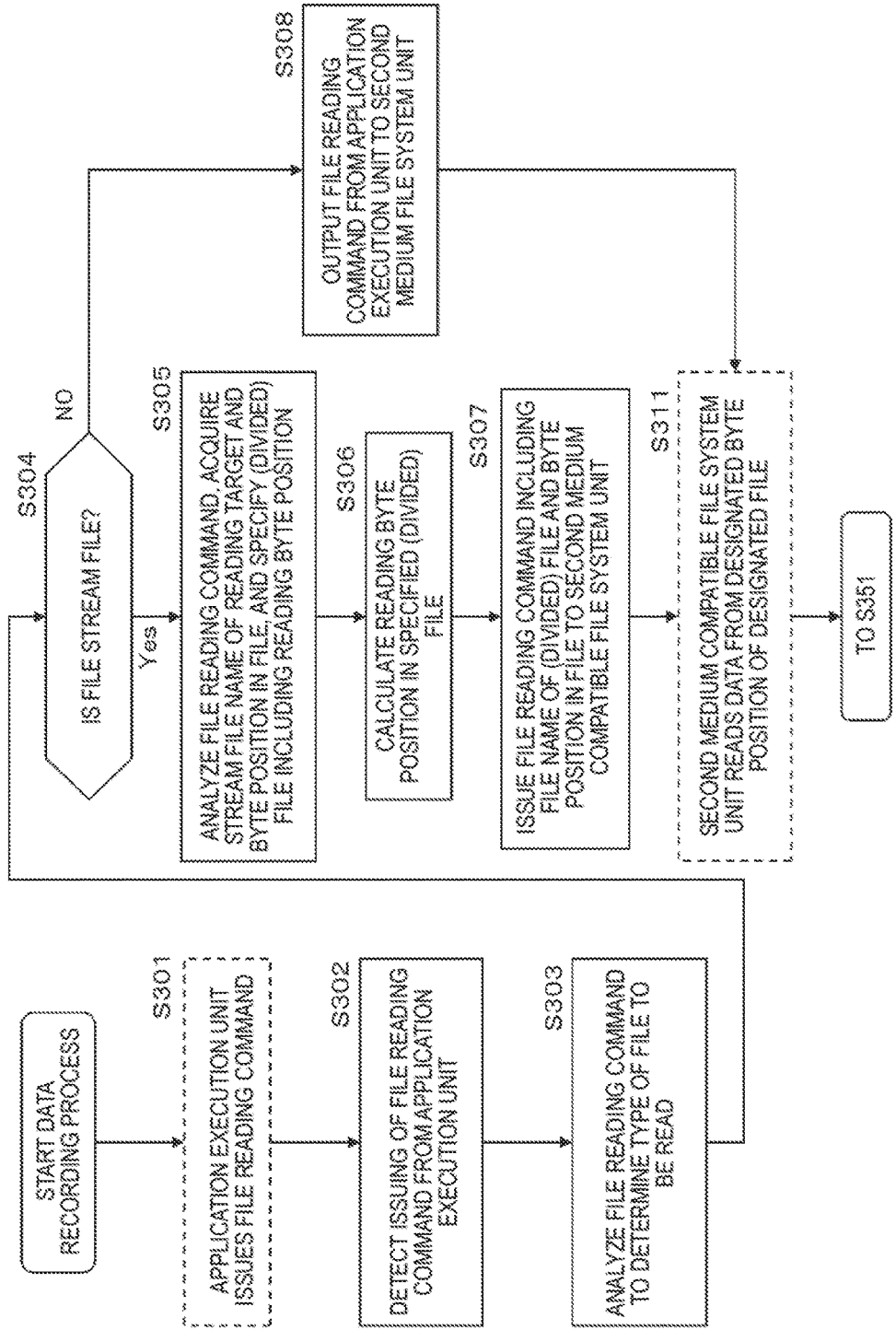
FIG. 21 is a diagram illustrating a flowchart for describing a processing sequence performed by the file conversion processing unit when a data reproducing process is performed from the second medium.

Next, a process of the file conversion processing unit 153 when a process of reproducing data from the second medium 112 is performed will be described with reference to the flowchart illustrated in FIG. 21 and the subsequent drawing. In the flow illustrated in FIG. 21, a process of step S301 is a process of the application execution unit, processes of step S302 to step S308 are processes of the file conversion processing unit, and a process of step S311 is a process of the second medium compatible file system unit.

First, in step S301, the application execution unit issues a file reading process command. This processing flow is a process when a reading target medium is the second medium. In step S301, the application execution unit issues the file reading command having the file name to be read and a byte position in a file corresponding to a reading start position in the file as parameters.

In step S302, the file conversion processing unit detects the issuing of the file reading command from the application execution unit.

Next, in step S303, the file conversion processing unit analyzes the file reading command issued by the application execution unit to determine a type of a file to be read.

In step S304, when the file conversion processing unit determines that the type of file is a stream file, the process proceeds to step S305. When it is determined in step S304 that the type of file is not a stream file, the process proceeds to step S308. In step S308, the file reading command from the application execution unit is output to the second medium file system unit without change.

As described above with reference to the flow of FIG. 17, the size of a file other than the stream file is equal to or less than the maximum file size (4 GB-1) allowed in the file system compatible with the second medium, and the writing of the file on the second medium is performed applying the file writing command from the application execution unit without change.

Accordingly, when the file reading process is performed, the file reading command from the application execution unit is output to the second medium file system unit without change in step S308, and then the file reading command from the application execution unit is applied without change and the reading of the file from the second medium is performed in step S311.

Conversely, when it is determined in step S304 that the type of file is a stream file, the process proceeds to step S305. When the type of file is the stream file, there is a probability of the file size being greater than the maximum allowable file size (4 GB-1) in the file system compatible with the second medium. Thus, as described above with reference to the flow of FIG. 17, there is a probability of the file being recorded as the divided files on the second medium. Further, the file name recorded on the second medium is recorded as a file name different from the file name requested from the application execution unit.

In step S305, the file conversion processing unit specifies a file including reading target data issued by the application execution unit based on the parameters (the original file name and the reading byte position) which are the parameters of the reading command issued by the application execution unit. In step S306, the file name of the file stored in the second medium and including the reading target data issued by the application execution unit and the reading byte position of the file serving as the reading position are calculated.

As described above with reference to FIGS. 17 and 19, when the stream file is recorded on the second medium, the file conversion processing unit performs the conversion between the file name of the file (original file) generated by the application execution unit and the record file name recorded on the second medium according to the preset rules. When the division process is performed at the time of recording of a file, the division process is performed according to the rules regulated in advance. According to the application rules, the file conversion processing unit calculates the file name of the file stored in the second medium and the reading byte position of the file serving as the reading start position based on the parameters (the original file name and the reading byte position) which are the parameters in the reading command issued by the application execution unit.

Figure 23:
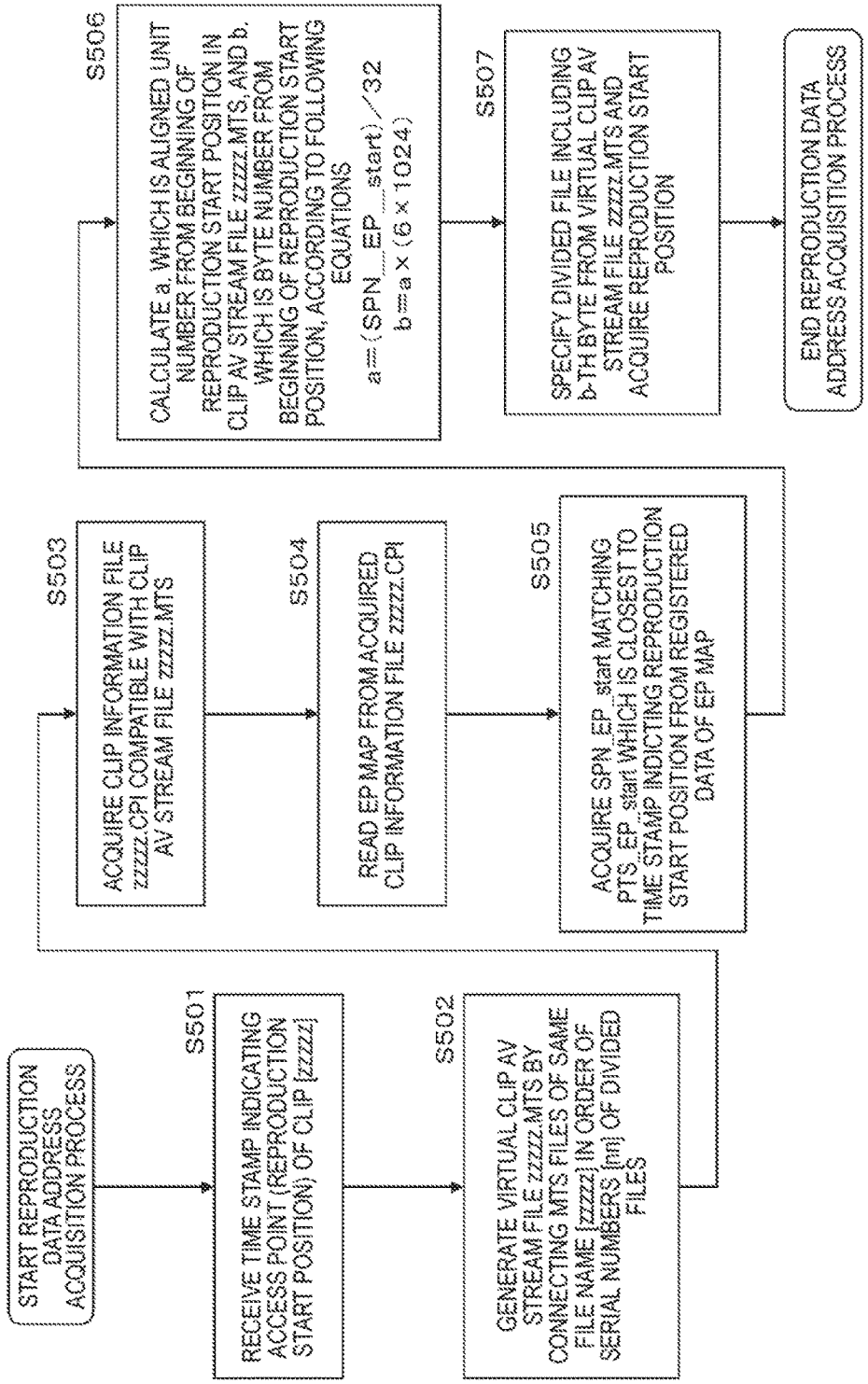
FIG. 23 is a diagram illustrating a flowchart for describing an address acquisition processing sequence of reproduced data when a data reproducing process is performed from the second medium.

The details of this process will be described below with reference to the flowchart illustrated in FIG. 23.

Next, in step S307, the file conversion processing unit issues a reading command including, as parameters, the file name of the reading target file and byte position information in the file serving as a reading start position to the second medium compatible file system unit.

In step S311, the second medium compatible file system unit reads the file from the second medium in response to the reading command issued in step S307 by the file conversion processing unit.

Figure 22:
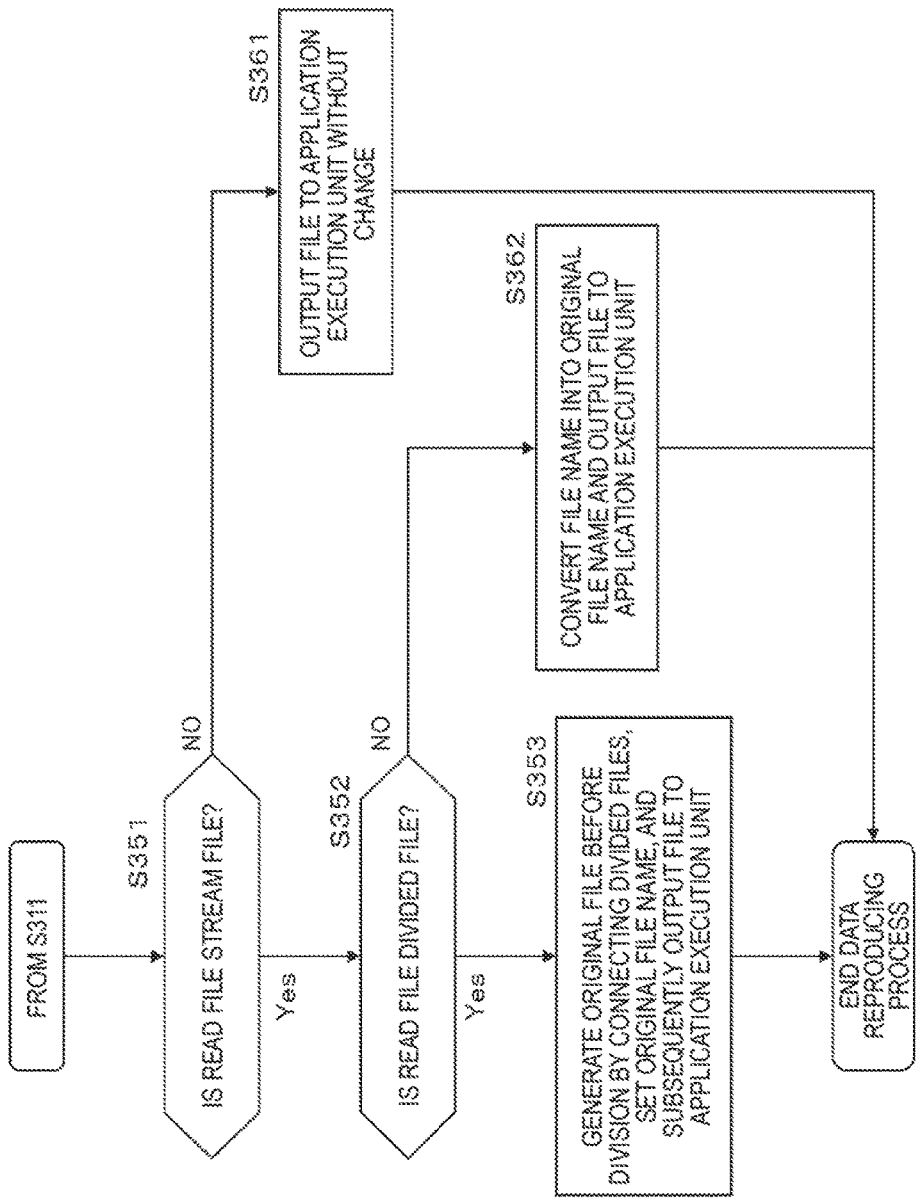
FIG. 22 is a diagram illustrating a flowchart for describing a processing sequence performed by the file conversion processing unit when a data reproducing process is performed from the second medium.

Thereafter, the file conversion processing unit further performs the process on the file read from the second medium by the second medium compatible file system unit according to the flow illustrated in FIG. 22. First, in step S351, it is determined whether the read file is a stream file. When the read file is not the stream file, the process proceeds to step S361. Then, the second medium compatible file system unit hands the file read from the second medium to the application execution unit without change, and the file reading process ends.

When it is determined in step S351 that the read file is not the stream file, the process proceeds to step S352. In step S352, the file conversion processing unit further determines whether the read file is a divided file.

When the read file is not the divided file, the process proceeds to step S362. In step S362, the file name of the file read from the second medium is converted into the original file name, the file is output to the application execution unit, and the process ends. Since the file name conversion rule is regulated in advance, the file conversion processing unit converts the file name according to the regulated rule. However, as described above, the setting can be performed such that the file name can also be converted only when the file division is performed. In this case, the process of step S362 can be omitted.

When it is determined in step S352 that the read file is the divided file, the process proceeds to step S353. In step S353, the original file before the division is generated by connecting the divided files read from the second medium, the original file name is set, the file is output to the application execution unit, and the process ends. Since the file division rule, the file connection rule, and the file name conversion rule are regulated in advance, the file conversion processing unit performs the file connection process and the file name setting process according to the regulated rules. Thus, by providing the file conversion processing unit 153 that restores the original file name from the divided file names and outputs the original file name to the application execution unit, the same module can be used as the application execution unit not only in the reproduction from the first medium 111 in which restriction on a file size is loose but also in the reproduction from the second medium 112 in which the restriction on a file size is strict. Therefore, it is possible to obtain the advantage of easily manufacturing a reproduction device.

In the reproduction data position calculation process of step S305 and step S306 in the reproducing process described with reference to FIG. 21, it is necessary to specify the divided file storing the reproduction data and specify the reproduction data position in the divided file.

As described above, the time stamp serving as the reproduction position information is recorded in the playlist, the process of acquiring the data corresponding to the reproduction position is performed by acquiring the address indicating the data position of the stream file based on the time stamp, and the EP map recorded in the clip information file is used for this process. This process has been described above with reference to FIGS. 9 to 11 and the other drawings.

The detailed sequence of the process of acquiring the address of reproduction data from the time stamp information and specifying reproduction target data will be described with reference to the flowchart illustrated in FIG. 23.

First, in step S501, the time stamp information indicating the access point which is the reproduction start position of a clip [zzzzz] on the time axis is received. For example, the time stamp indicating the randomly reproducible access point is recorded in the playlist file which is a reproduction control information file, and thus the time stamp is read from the playlist file.

Next, in step S502, the divided file having the same numeral sequence [zzzzz] as the clip [zzzzz] set as the record data of FAT32 as the high-order numeral sequence of the file name is acquired. That is, the files such as zzzzz-00.MTS, zzzzz-01.MTS, zzzzz-02.MTS, and so forth are acquired and the divided files are arranged applying the low-order numeral sequence [nn]. By arranging the low-order numeral sequence in the order of 00, 01, 02, 03, and so forth, the virtual clip AV stream file [zzzzz.MTS] corresponding to the first file system before the division can be generated.

Next, in step S503, the clip information file [zzzzz.CPI] corresponding to the clip AV stream file [zzzzz.MTS] is read. This clip information file is recorded on the second medium such as a flash memory without being divided.

Next, in step S504, the EP map is read from the acquired clip information file [zzzzz.CPI].

In step S505, the correspondent data which is included in the registered data of the EP map and is data between the presentation time stamp EP start (PTS_EP_start) and the source packet number EP start (SPN_EP_start) is acquired.

As described above with reference to FIG. 10, the EP map (EP_map) records the correspondent data between the presentation time stamp EP start (PTS_EP_start) and the source packet number EP start (SPN_EP_start).

The presentation time stamp EP start (PTS_EP_start) indicates a Presentation Time Stamp (PTS) of Access Unite starting from a randomly accessible I picture.

The source packet number EP start (SPN_EP_start) indicates a source packet number (SPN: Source Packet Number) including the first byte of an access unit (Access Unite) referred to by the value of the PTS_EP_start.

In the subsequent step S505, data (PTS_EP_start) which is the closest to the time stamp received in step S101 is selected from the presentation time stamp EP start (PTS_EP_start) registered in the EP map. That is, the randomly reproducible (PTS_EP_start) which is the closest to the time stamp received in step S101 is acquired. In the EP map, the source packet number EP start (SPN_EP_start) matching the (PTS_EP_start) is acquired.

The source packet number EP start (SPN_EP_start) corresponds to an address indicating the randomly reproducible packet position which is the closest to the time stamp position received in step S101.

Next, in step S506, the values of the following a and b are calculated to determine the data position specified by the above address:

a: a value indicating at which aligned unit the data position indicated by the reproduction position address (SPN_EP_start) is located from the beginning of the clip AV stream file [zzzzz.MTS] (the data position of the above address is included in an a-th aligned unit); and b: a value indicating at which byte the data position indicated by the reproduction position address (SPN_EP_start) is located from the beginning of the clip AV stream file [zzzzz.MTS] (the data position of the above address is included in a b-th byte).

The above a and b are calculated by the following equation:

$$a = (SPN\_EP\_start)/32; \text{ and}$$

$$b = a \times (6 \times 1024),$$

where an operator (/) in the calculation equation of the above a is division rounding down to the nearest integer.

According to the above equations, a and b are also calculated as integer values.

Next, in step S507, the a-th aligned unit from the virtual clip AV stream file [zzzzz.MTS] generated by connecting the divided files is acquired and the position at which the number of bytes from the beginning of the clip AV stream file [zzzzz.MTS] is b is specified.

An example of a process when the divided file including (SPN_EP_start) which is a reproduction position address corresponding to the reproduction start position is selected and a process of calculating the number of bytes b' from the beginning of the selected divided file is performed will be described with reference to FIG. 24.

FIG. 24(1) shows the virtual clip AV stream file [zzzzz.MTS] generated through the process of connecting the files, that is, the divided files zzzzz-00.MTS, zzzzz-01.MTS, and zzzzz-02.MTS having the same numeral sequence [zzzzz] as the clip [zzzzz] set as the record data of FAT32 as the high-order numeral sequence of the file name.

FIG. 24(2) shows file system information which is the management information of the file system of FAT32. The file system information includes information regarding the file name of an MTS file having the same numbers [zzzzz] as the high-order numeral sequence of the file name and the size (units of bytes) of the file. The file size of the MTS file having the same numbers [zzzzz] is added in ascending order of [nn], and the added value is compared to the value of the number of bytes [b] located from the beginning of the clip AV stream file and indicating the reproduction start position calculated before in step S506 in the flow of FIG. 23.

For example, as shown in FIG. 24(2), the file system records the following information as the file size of each of the divided files:

the divided MTS file [00001-00.MTS]: X;
the divided MTS file [00001-01.MTS]: Y;
the divided MTS file [00001-02.MTS]: Z.

Information regarding the file names and the sizes (units of bytes) of the files is included.

The file sizes are sequentially added.

The initial added value is X. Next, X+Y is obtained by adding Y. Next, X+Y+Z is obtained by adding Z. Then, when the added value exceeds b at the time of X+Y, the b-th byte in the clip AV stream file is determined to be present in the second divided file [00001-01.MTS]. Further, b' is calculated by the following equation:

$$b' = b - X.$$

The above b' indicates the number of bytes located from the beginning of the second divided file [00001-01.MTS] and indicating the reproduction start position.

In this way, the divided file including the data of the reproduction start position is specified, the number of bytes from the beginning of the specified divided file is calculated, the packet of the calculated point is acquired, and decoding and reproduction can be performed.

9. PARTIAL DELETION PROCESS FOR DATA OF DIVIDED FILES

When the data of the divided file [zzzzz-nn.MTS] is partially deleted, the deleted data is set as data with a size which is an integer multiple of the aligned unit and is an integer multiple of 96 kBytes (96×1024). However, when data at the end of the final divided file of one AV stream file is partially deleted, the deleted data may be data with a size which is an integer multiple of the aligned unit.

10. EXAMPLES OF CONFIGURATIONS OF OTHER INFORMATION PROCESSING DEVICES

In the above-described embodiment, the processing example in the configuration in which the plurality of media are included as data recording media as in the information processing device illustrated in FIG. 1 has been described. However, the process described in the above-described embodiment can also be applied to a configuration in which the first medium 111 illustrated in FIG. 1 is not included. That is, the process can also be applied to a configuration in which only the second medium 112 is included as a recording medium. Specifically, the process can also be applied to a configuration in which only a recording medium 512 is included and the first medium 111 described with reference to FIG. 1 is not included, as illustrated in FIG. 25.

An information processing device 500 illustrated in FIG. 25 includes a data processing unit (control unit) 501, a communication unit 502, an input unit 503, an output unit 504, a memory 505, a medium interface 507, and a recording medium 512. The data processing unit (control unit) 501, the communication unit 502, the input unit 503, the output unit 504, and the memory 505 have the same configurations as the data processing unit (control unit) 101, the communication unit 102, the input unit 103, the output unit 104, and the memory 105 of the information processing device illustrated in FIG. 1.

The medium interface 507 and the recording medium 512 correspond to the second medium interface 107 and the second medium 112 in the configuration illustrated in FIG. 1. In the configuration illustrated in FIG. 25, the recording medium 512 performs data recording according to, for example, a file system such as FAT32. However, the data processing unit 501 performs data processing using a file size or a file name corresponding to a file system (for example, UDF) different from the rules of the file size or the file name corresponding to the file system of the recording medium 512, as described in the above-described embodiment.

In the configuration illustrated in FIG. 25, a medium which is a data recording destination is only the recording medium 512. However, by configuring the data processing unit 512 such that the file conversion processing unit 153 described with reference to FIG. 2 and the like is set to perform the file conversion, it is possible to perform data recording, data reproduction, and data editing using the recording medium 512. Thus, the present invention can be applied to various configurations unsuitable for rules of a file system compatible with a medium which is a file recording destination or reading source of a data file used in an application executed by the data processing unit of the information processing device.

11. CONCLUSION OF CONFIGURATION ACCORDING TO THE PRESENT DISCLOSURE

The embodiments of the present disclosure have been described above in detail with reference to the specific embodiments. However, it should be apparent to those skilled in the art that the embodiments can be modified or substituted within the scope of the present disclosure without departing from the gist of the present disclosure. That is, the present invention has been disclosed as exemplified forms, and the present disclosure should not be construed as limiting. To determine the gist of the present disclosure, the claims should be taken into consideration.

Additionally, the present technology may also be configured as below.

(1)

An information processing device including:

an application execution unit configured to perform a record data generation process according to a first file system;

a second medium compatible file system unit configured to perform a data recording process according to a second file system different from the first file system; and a file conversion processing unit configured to perform a conversion process between a file compatible with the first file system and a file compatible with the second file system, wherein the file conversion processing unit inputs a file compatible with the first file system and generated by the application execution unit, generates a file compatible with the second file system and storing data with a size which is an integer multiple of a data size of a data processing unit in the first file system and is also an integer multiple of a data size of a data processing unit in the second file system, and outputs the generated file to the second medium compatible file system unit.

(2)

The information processing device according to (1), wherein the file conversion processing unit divides a file compatible with the first file system and generated by the application execution unit to generate a plurality of divided files with a size which does not exceed a maximum allowable file size regulated in the second file system as files compatible with the second file system, and outputs the divided files to the second medium compatible file system unit.

(3)

The information processing device according to (1) or (2), wherein the file conversion processing unit outputs a file compatible with the first file system and generated by the application execution unit to the second medium compatible file system unit by generating a file storing data with a size which is an integer multiple of a data size of an aligned unit regulated as an encryption processing unit in the first file system and is also an integer multiple of a data size of a cluster regulated as a minimum unit allocable to maintain file data in the second file system as a file compatible with the second file system.

(4)

The information processing device according to any one of (1) to (3), wherein the file conversion processing unit divides a file compatible with the first file system and generated by the application execution unit to generate a plurality of divided files with a size which does not exceed a maximum allowable file size regulated in the second file system, wherein, of the plurality of divided files, the file conversion processing unit generates the divided files other than the final divided file by generating files storing data with a size which is an integer multiple of a data size of an aligned unit regulated as an encryption processing unit in the first file system and is also an integer multiple of a data size of a cluster regulated as a minimum unit allocable to maintain file data in the second file system as files compatible with the second file system, and generates the final divided file by generating a file storing data with a size which is an integer multiple of the data size of the aligned unit regulated as the encryption processing unit in the first file system as a file compatible with the second file system, and wherein the file conversion processing unit outputs the plurality of generated files compatible with the second file system to the second medium compatible file system unit.

(5)

The information processing device according to any one of (1) to (4), wherein the file conversion processing unit outputs the file compatible with the first file system and generated by the application execution unit to the second medium compatible file system unit by generating a file with a data size which is an integer multiple of 6 Kbytes, which is a data size of an aligned unit regulated as an encryption processing unit in the first file system, and is also an integer multiple of 32 Kbytes, which is a data size of a cluster regulated as a minimum unit allocable to maintain file data in the second file system, as the file compatible with the second file system.

(6)

The information processing device according to any one of (1) to (5), wherein the file conversion processing unit divides the file compatible with the first file system and generated by the application execution unit to generate a plurality of divided files with a size which does not exceed a maximum allowable file size regulated in the second file system as files compatible with the second file system, and sets a file name including identification information of a division source file and arrangement information of the divided file in each of the plurality of generated divided files.

(7)

An information processing device including:

an application execution unit configured to perform a data reproducing process according to a first file system;

a second medium compatible file system unit configured to perform a data reproducing process according to a second file system different from the first file system; and a file conversion processing unit configured to perform a conversion process between a file compatible with the first file system and a file compatible with the second file system, wherein the file conversion processing unit inputs a plurality of divided files compatible with the second file system read from a second medium by the second medium compatible file system unit, generates the file compatible with the first file system by connecting the plurality of input divided files according to file names, and outputs the generated file to the application execution unit, and wherein the divided file is a file compatible with the second file system and storing data with a size which is an integer multiple of a data size of a data processing unit in the first file system and is also an integer multiple of a data size of a data processing unit in the second file system.

(8)

The information processing device according to (7), wherein the file conversion processing unit acquires a source packet number indicating a packet position corresponding to a time stamp serving as reproduction start position information from an EP map recorded in a clip information file and calculates a reproduction start position through a calculation process to which the acquired source packet number is applied.

(9)

The information processing device according to (8), wherein the file conversion processing unit specifies an aligned unit having the reproduction start position by dividing the source packet number by the number of constituent packets of the aligned unit regulated as an encryption processing unit in the first file system.

(10)

The information processing device according to (9), wherein the file conversion processing unit further calculates the number of bytes from a file beginning of the reproduction start position by performing a calculation process to which the number of constituent bytes of the aligned unit is applied.

(11)

An information recording medium recording a file according to a second file system different from a first file system suitable for a data reproducing process in an application execution unit of an information processing device, wherein the information recording medium has, as record data, a plurality of divided files obtained by dividing a file compatible with the first file system and generated by the application execution unit, and wherein the divided file is a file compatible with the second file system and storing data with a size which is an integer multiple of a data size of a data processing unit in the first file system and is also an integer multiple of a data size of a data processing unit in the second file system.

(12)

The information recording medium according to (11), wherein the divided file is a file with a size which does not exceed a maximum allowable file size regulated in the second file system and is a file storing data with a size which is an integer multiple of a data size of an aligned unit regulated as an encryption processing unit in the first file system and is also an integer multiple of a data size of a cluster regulated as a minimum unit allocable to maintain file data in the second file system.

(13)

The information processing medium according to (11) or (12), wherein each of the divided files is a file in which a file name including identification information of a division source file and arrangement information of the divided file is set.

Further, a method of processing performed in the above apparatus and system and a program to execute the processing are included in the configuration of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

In the configuration according to an embodiment of the present disclosure, as described above, a device and a method enabling data to be recorded and reproduced in a configuration for which an application execution unit and a file system of a data recording medium are not suitable are realized.

Specifically, the file conversion processing unit inputs the file compatible with the first file system generated by the application execution unit and generates a plurality of divided files compatible with the second file system and storing data with a size which is an integer multiple of a data size of an aligned unit regulated as a data processing unit in the first file system and is also an integer multiple of a cluster size which is a data processing unit in the second file system. At the time of reproduction, the divided files are connected to generate a stream file compatible with the virtual first file system.

In such a configuration, a device and a method enabling data to be recorded and reproduced in a configuration for which an application execution unit and a file system of a data recording medium are not suitable are realized.

REFERENCE SIGNS LIST

100 information processing device
101 data processing unit
102 communication unit 103 input unit
104 output unit
105 memory
106 first medium interface
107 second medium interface
111 first medium
112 second medium
151 encryption processing unit
152 application execution unit
153 file conversion processing unit
154 second medium compatible file system unit
181, 182 file
201, 202, 211 file
500 information processing device
501 data processing unit
502 communication unit
503 input unit
504 output unit
505 memory
507 medium interface
512 recording medium

The invention claimed is:

1. An information processing device, comprising:
one or more processors configured to:
receive a first file in a first file format compatible with a first file system;
convert the first file format compatible with the first file system to a second file format compatible with a second file system, wherein the second file system is a different file system from the first file system;
divide the first file based on a first file size of the first file that is greater than or equal to a maximum allowable file size regulated in the second file system;
generate a plurality of divided files compatible with the second file system based on the division of the first file,
wherein each divided file of the plurality of divided files has a second file size smaller than the maximum allowable file size,
wherein the second file size is both a first integer multiple of a first data size of an aligned unit regulated in the first file system and a second integer multiple of a second data size of a cluster size of the second file system, and
wherein the cluster size is a minimum unit that is allocated to store the first file in the second file system; and
output the plurality of divided files to a recording medium compatible with the second file system based on the second file format.

2. The information processing device according to claim 1, wherein the one or more processors are further configured to:
generate a final divided file based on generation of a second file that stores data in the first integer multiple of the first data size of the aligned unit regulated in the first file system, wherein the final divided file is a different file from the plurality of divided files; and
output the final divided file compatible with the second file system to the recording medium compatible with the second file system.

3. The information processing device according to claim 1,
wherein
the first data size is an integer multiple of 6 Kbytes, and
wherein the second data size is 32 Kbytes.

4. The information processing device according to claim 1, wherein the one or more processors are further configured to:
set a file name including identification information of a division source file and arrangement information of a divided file in each of the plurality of divided files.

5. An information processing device, comprising:
one or more processors configured to:
receive, from a recording medium, a plurality of divided files in a first file format compatible with a first file system;
convert the first file format compatible with the first file system to a second file format compatible with a second file system, wherein the second file system is a different file system from the first file system;
generate a first file compatible with the second file system based on a combination of the plurality of divided files,
wherein each divided file of the plurality of divided files has a first file size smaller than a maximum allowable file size regulated in the first file system,
wherein the first file size is both a first integer multiple of a first data size of a cluster size of the first file system and a second integer multiple of a second data size of a first aligned unit regulated in the second file system, and
wherein the cluster size is a minimum unit that is allocated to store the first file in the first file system; and
output the generated first file.

6. The information processing device according to claim 5, wherein the one or more processors are further configured to:
acquire a source packet number indicating a packet position corresponding to a time stamp that serves as reproduction start position information from an EP map recorded in a clip information file; and
calculate a reproduction start position based on the source packet number.

7. The information processing device according to claim 6, wherein the one or more processors are further configured to specify a second aligned unit having the reproduction start position based on division of the source packet number by a number of constituent packets of the second aligned unit regulated in the first file system.

8. The information processing device according to claim 7, wherein the one or more processors are further configured to calculate a number of bytes from a beginning of the reproduction start position based on a calculation to which a number of constituent bytes of the second aligned unit is applied.

9. An information recording apparatus, comprising:
an information recording medium configured to record a second file based on a second file system that is a different file system from a first file system suitable for reproduction of data in an information processing device, wherein the information recording medium comprises a plurality of divided files obtained based on division of a first file compatible with the first file system,
wherein the division of the first file is based on a first file size of the first file that is greater than or equal to a maximum allowable file size regulated in the second file system,
wherein a second file size of each divided file of the plurality of divided files is smaller than the maximum allowable file size, and wherein the second file size is both a first integer multiple of a first data size of an aligned unit regulated in the first file system and a second integer multiple of a second data size of a cluster size of the second file system, and wherein the cluster size is a minimum unit that is allocated to store the first file in the second file system.

10. The information recording apparatus according to claim 9, wherein each divided file of the plurality of divided files has a file name that includes identification information of a division source file and arrangement information of a respective divided file of the plurality of divided files.

11. An information processing method, comprising:

in an information processing device:

receiving a first file in a first file format compatible with a first file system;

converting the first file format compatible with the first file system to a second file format compatible with a second file system, wherein the second file system is a different file system from the first file system;

dividing the first file based on a first file size of the first file that is greater than or equal to a maximum allowable file size regulated in the second file system;

generating a plurality of divided files compatible with the second file system based on the division of the first file, wherein each divided file of the plurality of divided files has a second file size smaller than the maximum allowable file size, wherein the second file size is both a first integer multiple of a first data size of an aligned unit regulated in the first file system and a second integer multiple of a second data size of a cluster size of the second file system, and wherein the cluster size is a minimum unit that is allocated to store the first file in the second file system; and outputting the plurality of divided files to a recording medium compatible with the second file system based on the second file format.

12. An information processing method, comprising:

in an information processing device:

receiving, from a recording medium, a plurality of divided files in a first file format compatible with a first file system;

converting the first file format compatible with the first file system to a second file format compatible with a second file system, wherein the second file system is a different file system from the first file system;

generating a first file compatible with the second file system based on a combination of the plurality of divided files, wherein each divided file of the plurality of divided files has a first file size smaller than a maximum allowable file size regulated in the first file system, wherein the first file size is both a first integer multiple of a first data size of a cluster size of the first file system and a second integer multiple of a second data size of a first aligned unit regulated in the second file system, and wherein the cluster size is a minimum unit that is allocated to store the first file in the first file system; and outputting the generated first file.

13. A non-transitory computer-readable medium having stored thereon, computer-readable instructions, which when executed by a computer, cause the computer to execute operations, the operations comprising:

receiving a first file in a first file format compatible with a first file system;

converting the first file format compatible with the first file system to a second file format compatible with a second file system, wherein the second file system is a different file system from the first file system;

dividing the first file based on a first file size of the first file that is greater than or equal to a maximum allowable file size regulated in the second file system;

generating a plurality of divided files compatible with the second file system based on the division of the first file, wherein each divided file of the plurality of divided files has a second file size smaller than the maximum allowable file size, wherein the second file size is both a first integer multiple of a first data size of an aligned unit regulated in the first file system and a second integer multiple of a second data size of a cluster size of the second file system, and wherein the cluster size is a minimum unit that is allocated to store the first file in the second file system; and outputting the plurality of divided files to a recording medium compatible with the second file system based on the second file format.

14. A non-transitory computer-readable medium having stored thereon, computer-readable instructions, which when executed by a computer, cause the computer to execute operations, the operations comprising:

receiving, from a recording medium, a plurality of divided files in a first file format compatible with a first file system;

converting the first file format compatible with the first file system to a second file format compatible with a second file system, wherein the second file system is a different file system from the first file system;

generating a first file compatible with the second file system based on the plurality of divided files, wherein each divided file of the plurality of divided files has a first file size smaller than a maximum allowable file size regulated in the first file system, wherein the first file size is a first integer multiple of a first data size of a cluster size of the first file system and a second integer multiple of a second data size of a first aligned unit regulated in the second file system, and wherein the cluster size is a minimum unit that is allocated to store the first file in the first file system; and outputting the generated first file.

* * * * *